United States Patent
Mu et al.

(10) Patent No.: US 12,537,747 B2
(45) Date of Patent: Jan. 27, 2026

(54) METHOD FOR MODEL INFERENCE

(71) Applicants: BEIJING XIAOMI MOBILE SOFTWARE CO., LTD., Beijing (CN); BEIJING UNIVERSITY OF POSTS AND TELECOMMUNICATIONS, Beijing (CN)

(72) Inventors: Qin Mu, Beijing (CN); Wei Hong, Beijing (CN); Zhongyuan Zhao, Beijing (CN); Kexin Xiong, Beijing (CN)

(73) Assignees: BEIJING XIAOMI MOBILE SOFTWARE CO., LTD., Beijing (CN); BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 69 days.

(21) Appl. No.: 18/290,201

(22) PCT Filed: May 10, 2021

(86) PCT No.: PCT/CN2021/092900
§ 371 (c)(1),
(2) Date: Nov. 10, 2023

(87) PCT Pub. No.: WO2022/236638
PCT Pub. Date: Nov. 17, 2022

(65) Prior Publication Data
US 2024/0323099 A1    Sep. 26, 2024

(51) Int. Cl.
*G06F 13/00* (2006.01)
*H04L 41/044* (2022.01)
(Continued)

(52) U.S. Cl.
CPC ............ *H04L 41/16* (2013.01); *H04L 41/044* (2013.01); *H04L 41/34* (2022.05); *H04L 47/28* (2013.01)

(58) Field of Classification Search
CPC ....... H04L 41/16; H04L 41/044; H04L 41/34; H04L 47/28; H04W 88/085; H04W 24/02; H04W 88/18
(Continued)

(56) References Cited

U.S. PATENT DOCUMENTS

2024/0048988 A1* 2/2024 Pravinchandra Bhatt ................... H04L 63/1416
2024/0064066 A1* 2/2024 Chong ................ H04L 41/5067
(Continued)

OTHER PUBLICATIONS

PCT/CN2021/092900, International Search Report dated Dec. 27, 2021, 3 pages.
(Continued)

*Primary Examiner* — Kenneth R Coulter
(74) *Attorney, Agent, or Firm* — Cozen O'Connor

(57) ABSTRACT

A method for model inference, applicable for an operation administration and maintenance (OAM) entity, includes determining a first model corresponding to model subscription request information in response to receiving the model subscription request information sent by a control radio access network (RAN) device; and obtaining a first number of model segmentation blocks by segmenting the first model, and distributing the first number of model segmentation blocks to a first number of control RAN devices.

20 Claims, 17 Drawing Sheets

(51) Int. Cl.
  *H04L 41/16* (2022.01)
  *H04L 41/34* (2022.01)
  *H04L 47/28* (2022.01)

(58) Field of Classification Search
  USPC ....... 709/224, 223; 706/21, 16, 15; 718/105, 718/102, 100
  See application file for complete search history.

(56) References Cited

U.S. PATENT DOCUMENTS

| | | | |
|---|---|---|---|
| 2024/0112087 A1* | 4/2024 | Balasubramaniam | ....................... H04L 41/0853 |
| 2024/0265307 A1* | 8/2024 | Mu | ........................... G06N 3/08 |
| 2024/0276247 A1* | 8/2024 | Mu | ....................... H04W 24/04 |

OTHER PUBLICATIONS

CMCC "Solutions for AI-based load balancing" 3GPP TSG-RAN WG3 #112e, R3-212505, May 2021, 7 pages.
Lenovo et al. "Discussion on standard impact to support AI functionality" 3GPP TSG-RAN WG3 #112e R3-212180, May 2021, 3 pages.
Deutsche Telekom "High-level principles and definitions for the AI/ML-based functional framework for RAN intelligence" 3GPP TSG-RAN3 Meeting #112-e, R3-211632, May 2021, 8 pages.
Fraunhofer HHI "Use case and requirements for orchestration of AI/ML based closed loops to enable autonomous networks" International Telecommunication Union, Apr. 2021, 10 pages.
3GPP TR 22.874 V0.1.0 Technical Specification Group Services and System Aspects; Study on traffic characteristics and performance requirements for AI/ML model transfer in 5GS (Release 18) Sep. 2020, 55 pages.
European Patent Application No. 21941214.5, Search and Opinion dated Jan. 27, 2025, 16 pages.

* cited by examiner

METHOD FOR MODEL INFERENCE

CROSS REFERENCE TO RELATED APPLICATIONS

This application is a national phase application based on International Application No. PCT/CN2021/092900, filed May 10, 2021, the content of which is incorporated herein by reference for all purposes.

TECHNICAL FIELD

The present disclosure relates to a field of wireless communication technologies, more particularly, to a method for model inference.

BACKGROUND

In a new generation of communication technologies, decision-making of network intelligence and automation-related behaviors requires acquisition of a large amount of available data, including data acquired by a terminal and a network side device, by using artificial intelligence and machine learning. Related models at different levels are extracted by performing inference and training by using a machine learning algorithm based on the data.

SUMMARY

According to a first aspect of embodiments of the present disclosure, there is provided a method for model inference, applicable for an operation administration and maintenance (OAM) entity. The method includes:
  determining a first model corresponding to model subscription request information in response to receiving the model subscription request information sent by a control radio access network (RAN) device; and obtaining a first number of model segmentation blocks by segmenting the first model, and distributing the first number of model segmentation blocks to a first number of control RAN devices.

According to a second aspect of embodiments of the present disclosure, there is provided a method for model inference, applicable for a control radio access network (RAN) device. The method includes:
  in response to receiving a model analysis subscription request sent by a distributed RAN device, obtaining model subscription request information by processing the model analysis subscription request, and sending the model subscription request information to operation administration and maintenance (OAM) entity; and receiving model segmentation blocks sent by the OAM entity; in which the model segmentation blocks are model segmentation blocks determined by segmenting a first model, and the first model is determined by the OAM entity based on the model subscription request information.

According to a third aspect of embodiments of the present disclosure, there is provided a method for model inference, applicable for a distributed radio access network (RAN) device. The method includes:
  sending a model analysis subscription request to a control RAN device in response to receiving the model analysis subscription request sent by a terminal; in which the model analysis subscription request is configured to acquire a first model from an operation administration and maintenance (OAM) entity; and the first model includes a first number of model segmentation blocks.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The embodiments will be described, and examples thereof are shown in the accompanying drawings. When the following descriptions refer to the accompanying drawings, same numbers in different drawings represent same or similar elements unless otherwise indicated. The implementations described in the following embodiments do not represent all implementations consistent with the present disclosure. Rather, they are merely examples of apparatuses and methods consistent with some aspects of the disclosure as detailed in the appended claims.

In decision-making of a new generation of intelligence and automation related behaviors, it is required to acquire a large amount of available data, including data acquired by a terminal and a network side device, by using artificial intelligence and machine learning, and mine input data based on a machine learning algorithm, and extract related models at different levels, to drive by using an acquired model. In order to achieve an artificial intelligence (AI) wireless network enabled by big data, key technologies, such as a wireless network framework supporting AI, functions of an AI module/platform, input and output and a relationship with a wireless network element, are urgent issues to be studied.

Figure 1:
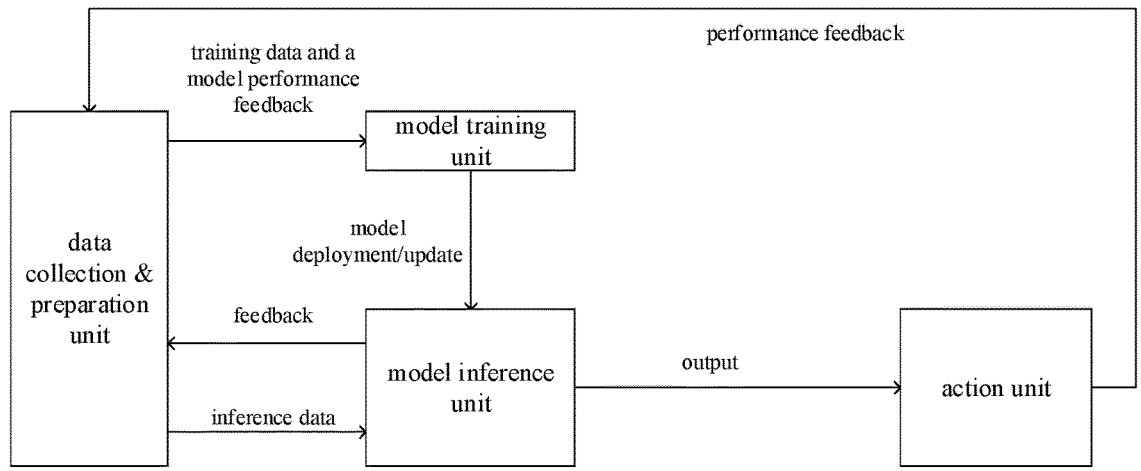
FIG. 1 a diagram illustrating a structure of a basic functional framework according to an embodiment.

Therefore, a study item for intelligence optimization at a radio access network (RAN) device side is provided, which includes an enhanced study on collection of NR and ENDC data, and design criteria, basic concept, applicable cases, and standard influences of which are discussed. FIG. 1 a diagram illustrating a structure of a basic functional framework according to an embodiment. As illustrated in FIG. 1, the basic functional framework, as an initial architecture is a wireless network architecture potentially supporting AI.

A data collection & preparation unit includes functions of data collection and data preprocessing, the data collection may be performed in a plurality of network elements, and provided data includes measurement data, performance data that is fed back and performance data of a model, etc.

A model training unit iterates a machine learning model based on operation and processing to obtain a better model for inference. Inputs include training data and a model performance feedback.

A model inference unit generates a prediction result or a decision-making result by using a trained machine learning model.

An action unit formulates and executes a strategy by using a model inference result, and provides, to the data collection unit, a feedback of a relevant performance result after performing the action.

Based on the above artificial intelligence architecture of the wireless network, intelligence power is injected to improve an experience of a wireless network terminal service. In order to maintain continuity and accuracy of an AI analysis service of the wireless network and improve AI operation efficiency of the wireless network, interaction between various AI function units is required to be further standardized and optimized, so that the AI architecture of the wireless network has stronger adaptability and expandability.

Figure 2:
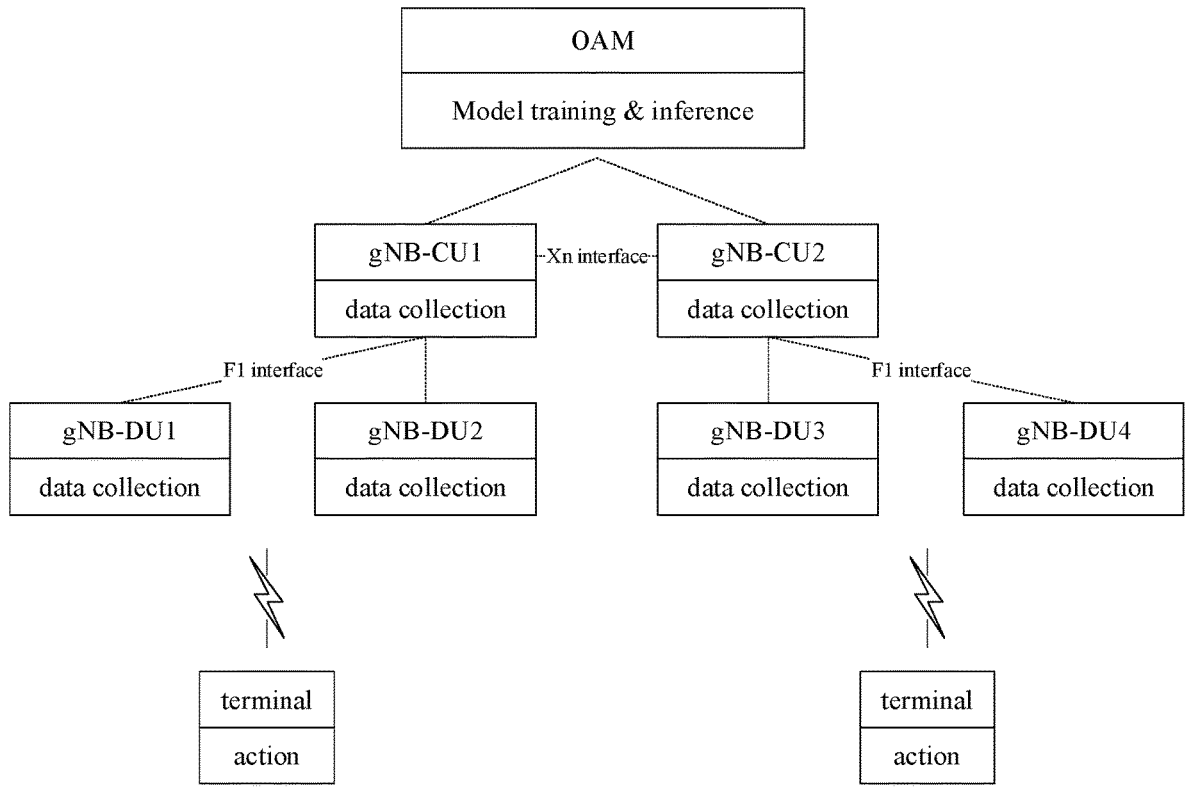
FIG. 2 is a diagram illustrating a network architecture according to an embodiment.

In the related art, when the terminal initiates a model analysis subscription request, inference and training may be performed by an OAM. FIG. 2 is a diagram illustrating a network architecture according to an embodiment. As illustrated in FIG. 2, the system includes a terminal, gNB-DUs, gNB-CUs and the OAM. The terminal accesses the gNB-DUs via a wireless channel, and a plurality of gNB-DUs access the gNB-CUs via an F1 interface, and the gNB-CUs are connected with each other via an Xn interface. The OAM is mainly responsible for work of a model training function unit in a wireless network architecture supporting AI, and is responsible for model training and model segmentation and other work. The gNB-CU is responsible for work of a model inference function unit, and is responsible for completing model inference. The gNB-DU is mainly responsible for work of a data collection function unit, and is responsible for collection of real-time inference data and collection of terminal performance feedback data and other work. The terminal is responsible for work of an action function unit, and is responsible for making a corresponding policy adjustment based on a model inference result.

The terminal is responsible for work of the action function unit; and the next generation Node B distributed unit (gNB-DU) is responsible for forwarding an analysis request and an inference result of the terminal, and executing work of a data collection function unit. The next generation Node B control unit (gNB-CU) is responsible for forwarding the analysis request and the inference result of the terminal, and executing work of the data collection function unit. The OAM is responsible for executing work of model training and model inference function units.

The execution process includes that: the terminal initiates an analysis subscription request to a gNB-DU, the gNB-DU sends the analysis subscription request of the terminal to a gNB-CU, and the gNB-CU reports the analysis subscription request of the terminal to the OAM. The OAM selects an appropriate model based on the analysis subscription request of the terminal, to start model inference work. The OAM initiates a model inference data request to the gNB-CU, and network elements at all levels (a gNB-CU, a gNB-DU and a terminal) collect model inference data based on inference data request information, and send the model inference data after data processing to the OAM. The OAM obtains an inference result by performing a model inference by using the model inference data, and sends the inference result to the gNB-CU, the gNB-CU sends the inference result to the gNB-DU, the gNB-DU sends the inference result to the terminal, and the terminal may make a corresponding policy adjustment based on the inference result.

However, in the related art, there are the following problems.

(1) All model inference work is completed by an OAM network management system, and all model inference data needs to be sent to the OAM. In the solution, real-time model inference data is uploaded from a wireless side to the network management system, which poses challenges to data security, especially in a scenario where the model inference data includes terminal service data, causing this solution to be limited.

(2) When the model inference work is completed, all model inference data needs to be uploaded to the OAM, and real-time data transmission is required. In a case of limited wireless communication resources, a network load may be increased.

(3) A model inference delay includes a transmission delay caused by uploading the model inference data to the OAM, a calculation delay of model inference, and a transmission delay brought by sending the inference result from the OAM to the terminal. The first part of the delay is relatively large, which may result in a feedback of the inference result being not timely, and influence a service experience of the terminal.

(4) All model inference tasks are sent to the OAM, furthermore, the OAM also needs to complete model training. When analysis subscription requests of the terminal are intensive, a computing power of the OAM may be insufficient, which may reduce a system efficiency.

Based on this, a method for model inference is provided in the disclosure. Model inference tasks are allocated to different gNB-CUs (that is, control RAN devices in embodiments of the present disclosure). Further, on the basis of a wireless network AI architecture, the model is segmented based on an AI processing capacity of each network element, and a plurality of network elements with AI processing capacities are selected to assist the model inference network element to which the terminal belongs in jointly completing the model inference work, and provide a feedback on the inference result to the terminal, and the terminal performs a corresponding policy adjustment based on the inference result, and provide a feedback on performances, to achieve continuous optimization of the model.

The specific process is as follows. First, the terminal initiates a model analysis subscription request, and the gNB-CU accessed by the terminal generates model subscription request information based on its own AI processing capacity and analysis subscription request information of the terminal, and reports the model subscription request information to the OAM. The OAM performs model selection and model segmentation, and allocation and distribution of model segmentation blocks based on the model subscription request, and sends allocation information of the model segmentation blocks to all gNB-CUs participating in joint inference. The gNB-CU accessed by the terminal initiates a model inference data request, and relevant network elements collect and process data and send the data to the gNB-CU. The gNB-CU accessed by the terminal completes inference of a first model segmentation block by using the model inference data, and sends an inference intermediate result to the gNB-CU where a next model segmentation block is located based on the allocation information of the model segmentation blocks, until a gNB-CU responsible for an inference task of a last model segmentation block obtains an inference result and then sends the inference result to the gNB-CU accessed by the terminal based on the allocation information of the model segmentation block. The gNB-CU accessed by the terminal sends the inference result to the terminal, and the terminal makes a corresponding policy adjustment by using the inference result. The gNB-CU collects model performance data and terminal performance feedback data and reports the model performance data and the terminal performance feedback data to the OAM, and the OAM trains and optimizes the model, and sends an updated model parameter to the gNB-CU.

In a scenario where the terminal has high-speed mobility, re-delivery of a wireless network AI analysis task is carried out. Terminal access location information is added to analysis request information. When a terminal access location changes, the access location information in the analysis request information is globally maintained by re-initiating the analysis request, and inference result forwarding and performing model selection and segmentation again and other processes are added to achieve smooth delivery of the model inference task after making a switched on the terminal, which ensures continuity and accuracy of an AI analysis service. Specifically, it may be divided into two scenarios.

1) When the terminal is switched to access another gNB-DU (that is, a distributed RAN device in embodiments of the present disclosure) under the same gNB-CU, the terminal re-initiates an analysis subscription request, and the gNB-CU and the OAM update analysis subscription request information of the terminal. When a current inference task is not completed in a case that the switch is made on the terminal, the gNB-CU continues completing the inference task, obtains the inference result, and sends the inference result to the gNB-DU currently accessed by the terminal based on an access location in an updated analysis subscription request message, and the gNB-DU sends the inference result to the terminal. When the terminal completes the switch, a newly accessed gNB-DU is responsible for completing collection and forwarding of relevant data.

2) When the terminal is switched to access another gNB-CU, the terminal resends a model analysis subscription request, and a newly accessed gNB-CU of the terminal sends a model subscription request to the OAM. The OAM updates the analysis subscription request of the terminal, and sends updated analysis subscription request information to a source gNB-CU of the terminal. When the current inference task is not completed in a case that the switch is made on the terminal, the source gNB-CU completes the inference task, obtains the inference result, and sends the inference result to the gNB-CU newly accessed by the terminal based on an access location in the updated analysis subscription request information. The source gNB-CU updates model subscription analysis request information of the terminal, and is no longer responsible for tasks related to the model subscription analysis request of the terminal. The gNB-CU newly accessed by the terminal sends the inference result to a gNB-DU newly accessed by the terminal, and the gNB-DU sends the inference result to the terminal. The OAM performs model selection and segmentation again based on the model subscription analysis request from the gNB-CU newly accessed by the terminal, and sends allocation information of model segmentation blocks to the gNB-CU participating in joint inference. In the embodiment, an AI processing capacity of a base station may be developed better, which solves the problem of an insufficient AI processing capacity of the base station, and is beneficial to balancing a network load. A method for delivering a wireless network AI analysis task in the scenario of high-speed terminal mobility, which solves the problem of a discontinuous AI analysis service caused by terminal switching, ensures efficiency and continuity of a wireless network AI analysis service, and improves a service experience of the terminal, and is beneficial to improving an operation efficiency of a wireless network.

It may be further understood that, the wireless communication system in embodiments of the present disclosure is a network that provides a wireless communication function. The wireless communication system may adopt different communication technologies, for example, code division multiple access (CDMA), wideband code division multiple access (WCDMA), time division multiple access (TDMA), frequency division multiple access (FDMA), orthogonal frequency-division multiple access (OFDMA), single Carrier FDMA (SC-FDMA) and carrier sense multiple access with collision avoidance. Networks may be classified into a 2G (generation) network, a 3G network, a 4G network or a future evolution network, e.g., a 5G network, which may also be referred to as a new radio (NR) network, based on capacities, rates, latencies and other factors of different networks. For ease of description, a wireless communication network is simply referred to as a network in the disclosure sometimes.

Further, the network device in the present disclosure may also be referred to as a wireless access network device. The wireless access network device may be an access point (AP), a wireless relay node, a wireless backhaul node, a transmission point (TP), or a transmission and reception point (TRP), etc., in a base station, an evolved node B (a base station), a home base station and a wireless fidelity (WiFi) system, or may be a gNB in an NR system, or may also be a component constituting a base station or a part of a device. The network device further may be a vehicle-mounted device in an Internet of Vehicles (V2X) communication system. It should be understood that, a specific technology and a specific device form adopted by the network device are not limited in the embodiments of the present disclosure.

Further, the terminal in the present disclosure further may be referred to as a terminal device, a user equipment (UE), a mobile station (MS), a mobile terminal (MT), etc., and is a device that provides voice and/or data connectivity to a user, and for example, the terminal may be a handheld device with a wireless connection function or a vehicle device, etc. Herein, some terminals include, for example, a mobile phone, a pocket personal computer (PPC), a palm computer, a personal digital assistant (PDA), a notebook computer, a tablet computer, a wearable device, or a vehicle-mounted device. In addition, the terminal device further may be a vehicle-mounted device in an Internet of Vehicles (V2X) communication system. It should be understood that, a specific technology and a specific device form adopted by a terminal are not limited in the embodiments of the present disclosure.

Figure 3:
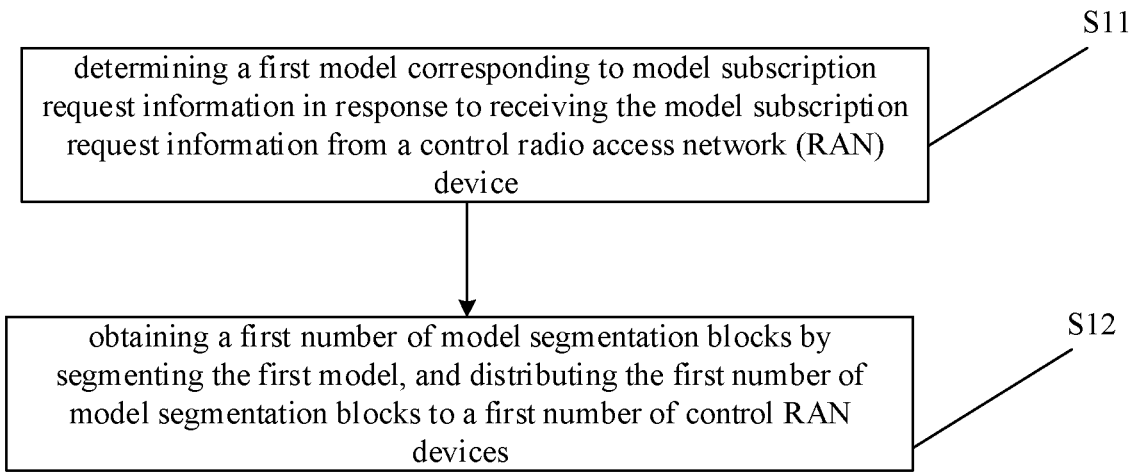
FIG. 3 is a flowchart illustrating a method for model inference according to an embodiment.

FIG. 3 is a flowchart illustrating a method for model inference according to an embodiment. As illustrated in FIG. 3, the method for model inference is applicable for an OAM entity. The method includes the following steps.

At step S11, a first model corresponding to model subscription request information is determined in response to receiving the model subscription request information from a control radio access network (RAN) device.

In embodiments of the disclosure, the model subscription request information includes AI processing capacity information of a control RAN device itself, and model subscription analysis request information of a terminal. The AI processing capacity information includes a computing speed of a base station server and a current surplus computing power. The OAM selects models that conform to the model analysis subscription request information of the terminal based on the model subscription information, and further determines a model with an appropriate scale, that is, a first model among models that meets requirements, based on the AI processing capacity of the control RAN device. For convenience of description in the disclosure, the model with an appropriate scale that meets requirements is referred to as a first model.

At step S12, a first number of model segmentation blocks are obtained by segmenting the first model, and the first number of model segmentation blocks are distributed to a first number of control RAN devices.

In embodiments of the disclosure, the OAM segments the first model into the first number of model segmentation blocks based on the AI processing capability of the control RAN device, and determines a same number of control RAN devices based on the first number. The first number of model segmentation blocks are distributed to the first number of control RAN devices. The first number of control RAN devices are determined by the OAM based on the control RAN devices adjacent to the control RAN device sending the model subscription request information. The basis for determination may be that a computing power occupation condition and a load condition of the control RAN device are relatively idle.

In the method for model inference provided in embodiments of the disclosure, by collaborative inference of a plurality of control RAN devices, a computing power can be balanced to a plurality of different control RAN devices and the local AI processing capacity of the control RAN device can be fully utilized, which effectively enhances a model inference efficiency.

In some embodiments of the present disclosure, each of the first number of model segmentation blocks correspondingly has allocation information. The allocation information includes an inference sequence of the first number of model segmentation blocks, and the control RAN device corresponding to each of the first number of model segmentation blocks. The control RAN device corresponding to each of the first number of model segmentation blocks is included in the allocation information in a form of a corresponding identifier.

In some embodiments of the disclosure, the first number of control RAN devices include a first control RAN device, and the first control RAN device is a control RAN device accessed by the terminal.

Figure 4:
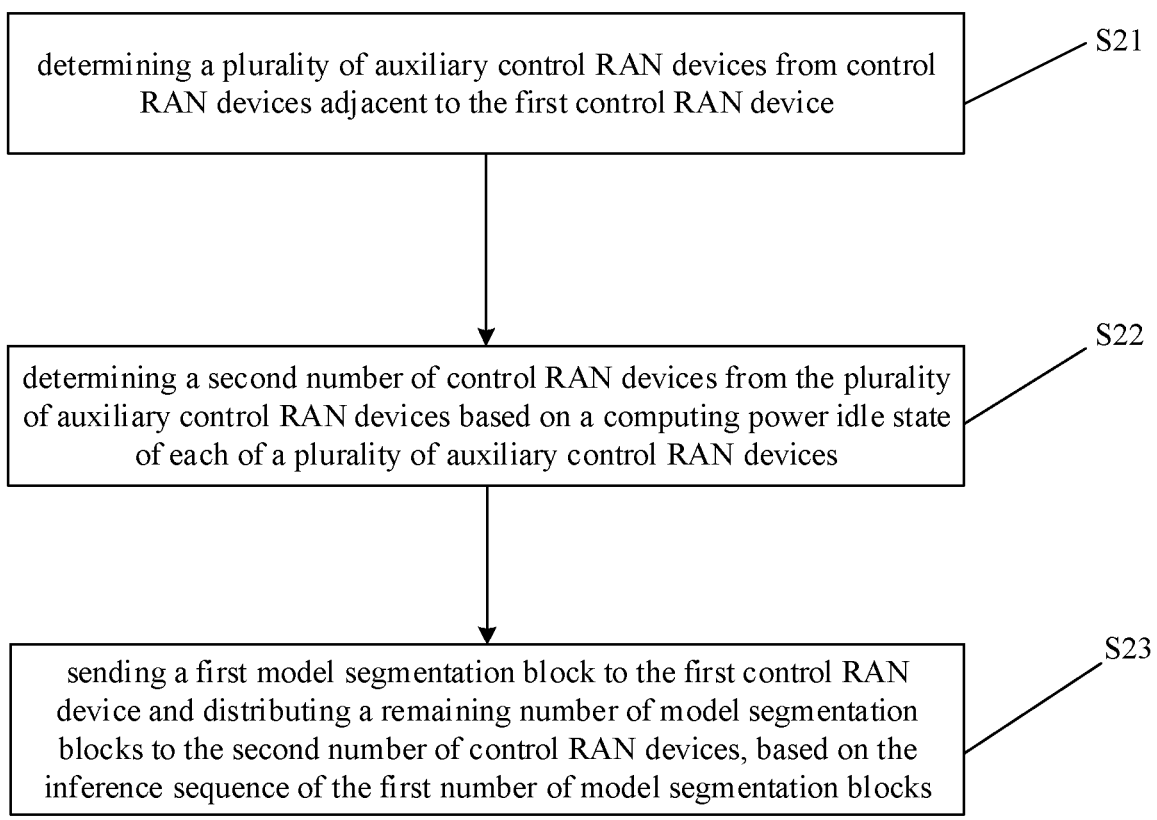
FIG. 4 is a flowchart illustrating another method for model inference according to an embodiment.

FIG. 4 is a flowchart illustrating a method for model inference according to an embodiment. As illustrated in FIG. 4, the method for model inference is applicable to an OAM entity. The method includes the following steps.

At step S21, a plurality of auxiliary control RAN devices are determined from control RAN devices adjacent to the first control RAN device.

In embodiments of the disclosure, the OAM selects the auxiliary control RAN device that may assist in model inference, from the control RAN devices adjacent to the first control RAN device.

At step S22, a second number of control RAN devices are determined from the plurality of auxiliary control RAN devices based on a computing power idle state of each of a plurality of auxiliary control RAN devices.

In embodiments of the disclosure, the OAM determines a second number of control RAN devices participating in model inference based on a computing power occupation state and a load of each control RAN device. The second number of control RAN devices are control RAN devices in the first number of control RAN devices other than the first control RAN device.

At step S23, a first model segmentation block is sent to the first control RAN device and a remaining number of model segmentation blocks are distributed to the second number of control RAN devices, based on the inference sequence of the first number of model segmentation blocks.

In embodiments of the disclosure, the OAM sends the first model segmentation block to the first control RAN device (for example, a gNB-CU1) and sends the remaining number of model segmentation blocks to other control RAN devices participating in joint inference, and sends allocation information corresponding to the model segmentation blocks to all control RAN devices participating in joint inference.

Figure 5:
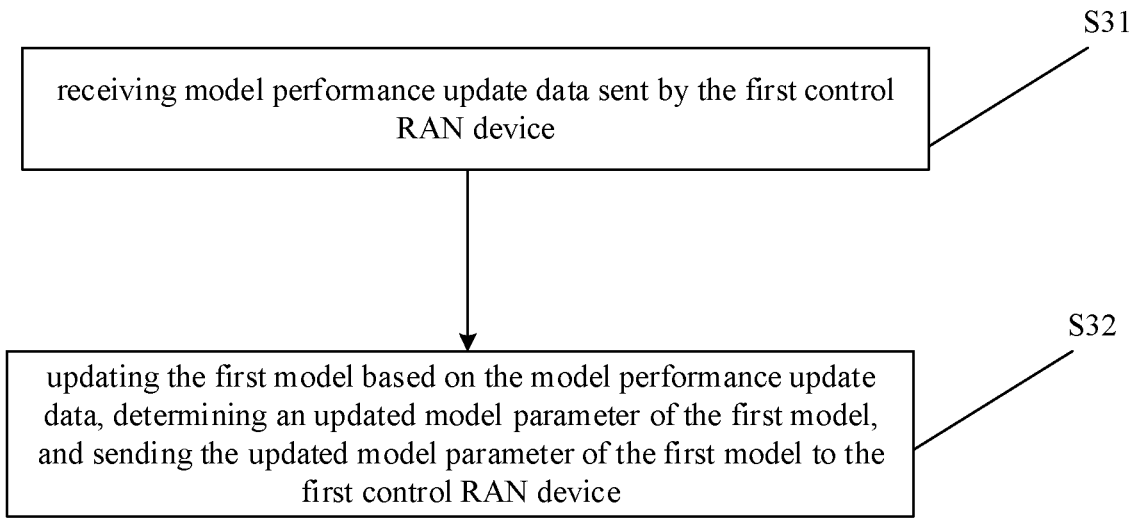
FIG. 5 is a flowchart illustrating another method for model inference according to an embodiment.

FIG. 5 is a flowchart illustrating a method for model inference according to an embodiment. As illustrated in FIG. 5, the method for model inference is applicable to an OAM entity. The method includes the following steps.

At step S31, model performance update data sent by the first control RAN device is received.

In embodiments of the disclosure, the first control RAN device determines the model performance update data by comparing the received performance data with a first inference result of the first model, and sends the model performance update data to the OAM. The model performance update data may be a model precision. The OAM may further receive performance data sent by the first control RAN device.

At step S32, the first model is updated based on the model performance update data, an updated model parameter of the first model is determined, and the updated model parameter of the first model is sent to the first control RAN device.

In embodiments of the disclosure, the OAM trains and optimizes the first model based on performance data and model performance update data to obtain the updated model parameter of the first model, and sends the updated model parameter of the first model to the first control RAN device.

In some embodiments of the disclosure, in response to the OAM receiving the first model analysis subscription update request, and information included in the first model analysis subscription update request being model analysis request information of the model, the model analysis request information of the model is updated based on the first model analysis subscription update request.

In some embodiments of the disclosure, in response to the OAM receiving the first model analysis subscription update request, and information included in the first model analysis subscription update request being model analysis subscription information of the terminal and AI processing capacity information of a second control RAN device, the first model is re-segmented based on the model analysis subscription information and the AI processing capacity information of the second control RAN device, the first model segmentation block is sent to the second control RAN device and the remaining number of model segmentation blocks are sent to other control RAN devices participating in inference.

Figure 6:
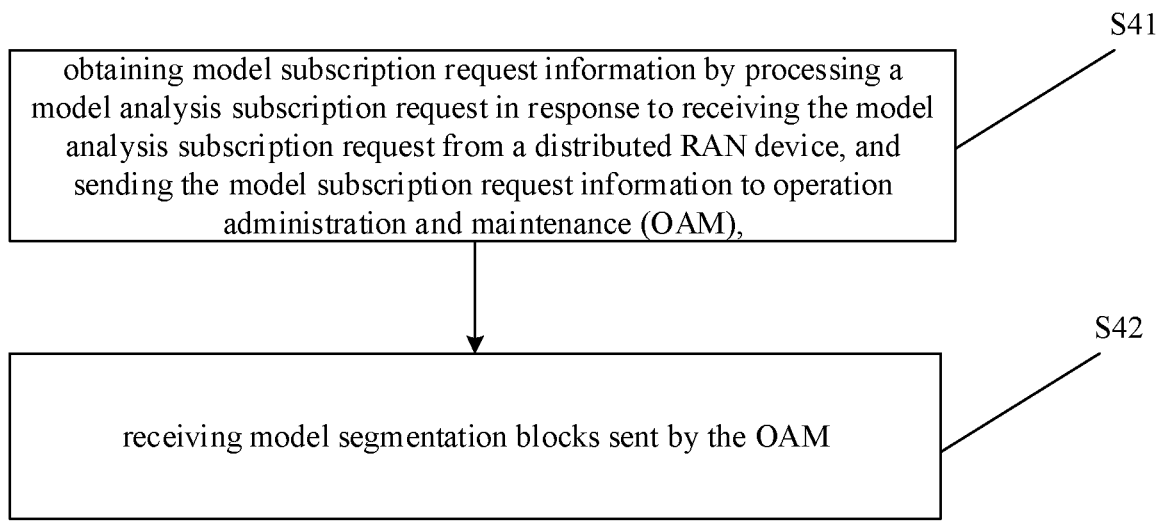
FIG. 6 is a flowchart illustrating another method for model inference according to an embodiment.

FIG. 6 is a flowchart illustrating a method for model inference according to an embodiment. As illustrated in FIG. 6, the method for model inference is applicable to a control RAN device. The method includes the following steps.

At step S41, model subscription request information is obtained by processing a model analysis subscription request in response to receiving the model analysis subscription request from a distributed RAN device, and the model subscription request information is sent to operation administration and maintenance (OAM).

In embodiments of the disclosure, the model analysis subscription request includes an identifier of the terminal, an analysis request type and access location information. For example, the terminal accesses the first distributed RAN device (for example, a gNB-DU1), and the gNB-DU1 and the gNB-DU2 access the gNB-CU1. The terminal identifier is a GUTI, and the analysis request type is represented by an analysis ID, and for example, an analysis ID 1: a location prediction analysis service, and an analysis ID 2: a load prediction analysis service. The access location mainly includes information about the distributed RAN device and the control RAN device currently accessed by the terminal.

The control RAN device generates the model subscription request information based on its own AI processing capacity and the model analysis subscription request, in response to receiving the model analysis subscription request from the distributed RAN device, and sends the model subscription request information to the OAM.

At step S42, model segmentation blocks sent by the OAM are received.

In embodiments of the present disclosure, the model segmentation blocks are segmentation blocks determined by segmenting the first model. The first model is determined by the OAM based on the model subscription request information.

In the method for model inference provided in embodiments of the disclosure, by collaborative inference of a plurality of control RAN devices, a computing power is balanced to a plurality of different control RAN devices and the local AI processing capacity of the control RAN device is fully utilized, which effectively enhances a model inference efficiency.

Figure 7:
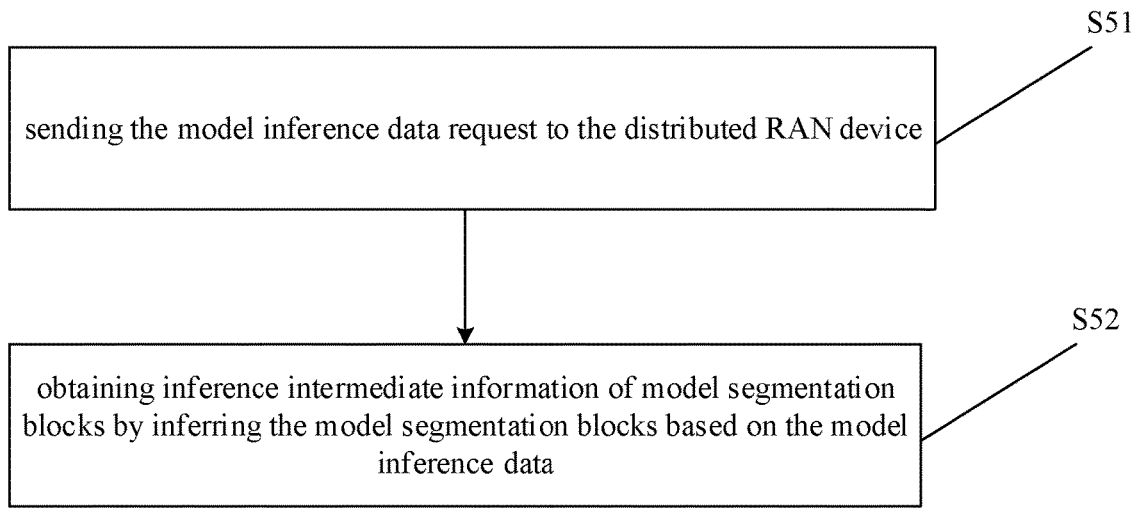
FIG. 7 is a flowchart illustrating another method for model inference according to an embodiment.

FIG. 7 is a flowchart illustrating a method for model inference according to an embodiment. As illustrated in FIG. 7, the method for model inference is applicable to a control RAN device. The method includes the following steps.

At step S51, the model inference data request is sent to the distributed RAN device.

In embodiments of the disclosure, the model inference data request is configured to acquire model inference data. The control RAN device sends the model inference data request to the distributed RAN device. It is to be noted that, the control RAN device may send the model inference data request to the distributed RAN device accessed by the terminal, or may send the model inference data request to other distributed RAN devices participating in inference within the range of the control RAN device.

At step S52, inference intermediate information of model segmentation blocks is obtained by inferring the model segmentation blocks based on the model inference data.

In embodiments of the disclosure, the model inference data includes model inference data collected by the distributed RAN device and model inference data reported by the terminal. The control RAN device determines inference intermediate information of each model segmentation block by inferring the model segmentation block based on the received model inference data.

In some embodiments of the present disclosure, each model segmentation block correspondingly has allocation information. The control RAN device receives the model segmentation blocks and receives the allocation information. The allocation information includes an inference sequence of the first number of model segmentation blocks, and the control RAN device corresponding to each of the first number of model segmentation blocks. The control RAN device corresponding to each of the first number of model segmentation blocks is included in the allocation information in a form of a corresponding identifier.

Figure 8:
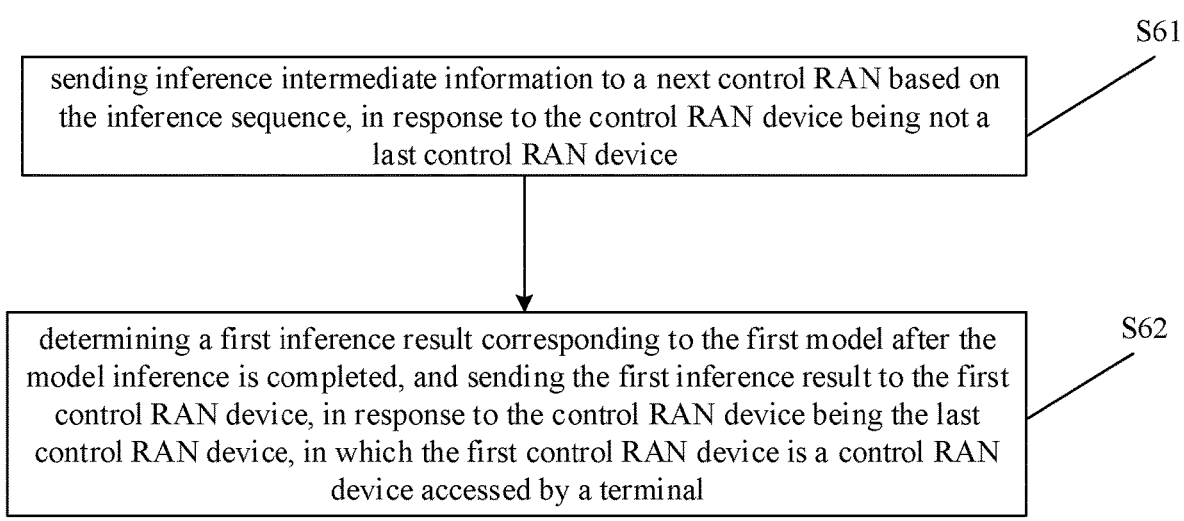
FIG. 8 is a flowchart illustrating another method for model inference according to an embodiment.

FIG. 8 is a flowchart illustrating a method for model inference according to an embodiment. As illustrated in FIG. 8, the method for model inference is applicable to a control RAN device. The method includes the following steps.

At step S61, inference intermediate information is sent to a next control RAN based on the inference sequence, in response to the control RAN device being not a last control RAN device.

In embodiments of the disclosure, a current control RAN device sends inference intermediate information to a control RAN device where a next model segmentation block is located based on the inference sequence of model segmentation blocks in the allocation information, in response to the control RAN device of a current inference model being not a control RAN device where a last control RAN device is located.

At step S62, a first inference result corresponding to the first model is determined after the model inference is completed, and the first inference result is sent to the first control RAN device, in response to the control RAN device being the last control RAN device. The first control RAN device is a control RAN device accessed by the terminal.

In embodiments of the disclosure, the current control RAN device completes inference of the first model and determines a first inference result corresponding to the first model based on the inference sequence of the inference model segmentation blocks in the allocation information, and sends the first inference result to a control RAN device where the first model segmentation block is located, that is, the first control RAN device, in response to the control RAN device of the current inference model being the control RAN device where the last control RAN device is located. The first control RAN device is a control RAN accessed by the terminal.

In the method for model inference in the disclosure, the first model segmentation block is ensured to be inferred in the control RAN device currently accessed by the terminal, and original inference data required by inference of the terminal is only provided for a currently accessed RAN device. Inference intermediate information is only transmitted between other control RAN devices participating in joint inference, and a feature processing is performed on the inference intermediate information, with a small data volume, and terminal information is difficult to be reversely inferred, which ensures security of sensitive data of a wireless network and saves a data transmission overhead.

Figure 9:
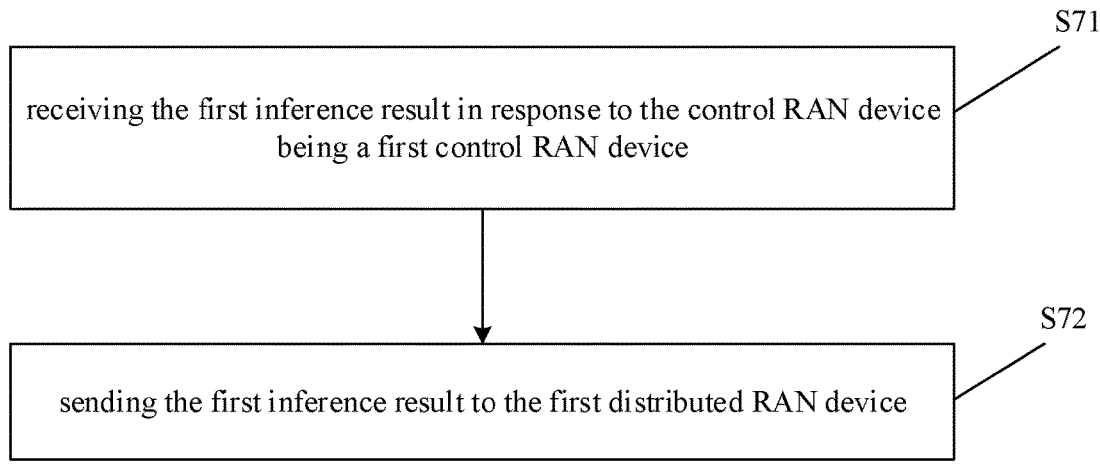
FIG. 9 is a flowchart illustrating another method for model inference according to an embodiment.

FIG. 9 is a flowchart illustrating a method for model inference according to an embodiment. As illustrated in FIG. 9, the method for model inference is applicable to a control RAN device. The method includes the following steps.

At step S71, the first inference result is received in response to the control RAN device being a first control RAN device.

In embodiments of the disclosure, the control RAN device corresponding to the last model segmentation block completes inference to determine a model inference result, that is, the first inference result. The first inference result is sent to the first control RAN device, and the first control RAN device obtains a first model inference result corresponding to the first model.

At step S72, the first inference result is sent to the first distributed RAN device.

In embodiments of the disclosure, the first control RAN device determines the first inference result of the first model based on the received inference result. The first inference result is sent to a distributed RAN device accessed by the terminal.

Figure 10:
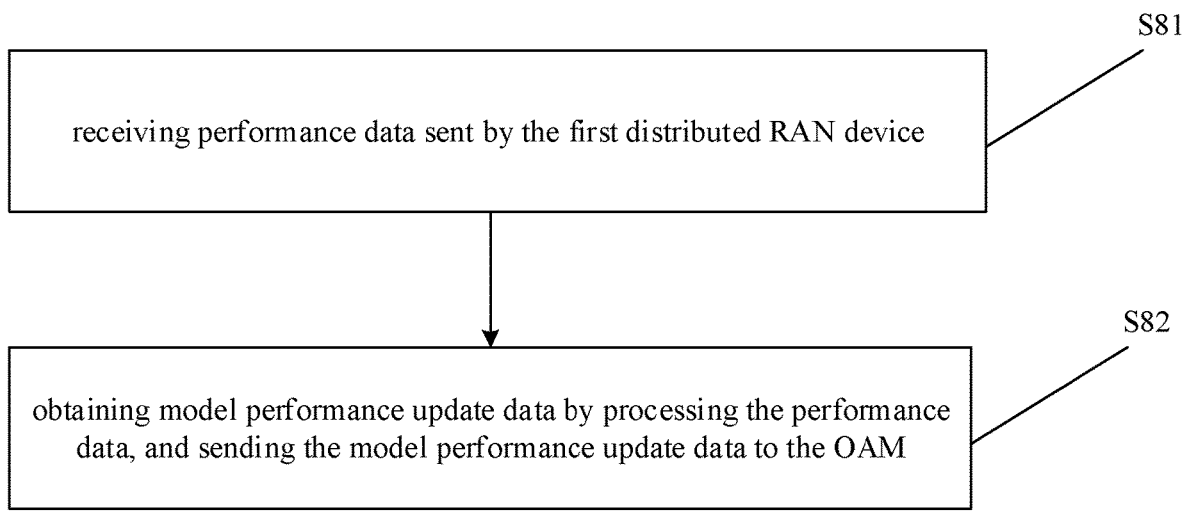
FIG. 10 is a flowchart illustrating another method for model inference according to an embodiment.

FIG. 10 is a flowchart illustrating a method for model inference according to an embodiment. As illustrated in FIG. 10, the method for model inference is applicable to a control RAN device. The method includes the following steps.

At step S81, performance data sent by the first distributed RAN device is received.

In embodiments of the disclosure, the performance data is real performance data after the terminal adjusts an execution strategy based on the first model. The terminal reports obtained real performance data to the distributed RAN device accessed after adjusting an execution strategy based on the first model. The distributed RAN device sends the real performance data to the control RAN device. For example, the distributed RAN device accessed by the terminal is a gNB-DU1, and the control RAN device corresponding to the gNB-DU1 is a gNB-CU1, and the terminal determines real performance data and sends the real performance data to the gNB-DU1, and the gNB-DU1 reports the real performance data to the gNB-CU1.

The performance data may be a quantization of performance improvement brought by an AI analysis service. For example, the terminal saves power consumption by 5% when subscribing some kind of analysis and executing a corresponding policy adjustment based on an analysis result.

At step S82, model performance update data is obtained by processing the performance data, and is sent to the OAM.

In embodiments of the disclosure, the performance data includes model performance data and performance feedback data fed back by the terminal. The first control RAN device obtains model performance update data by processing based on the model performance data and the performance feedback data fed back by the terminal, and sends the model performance update data to the OAM.

Figure 11:
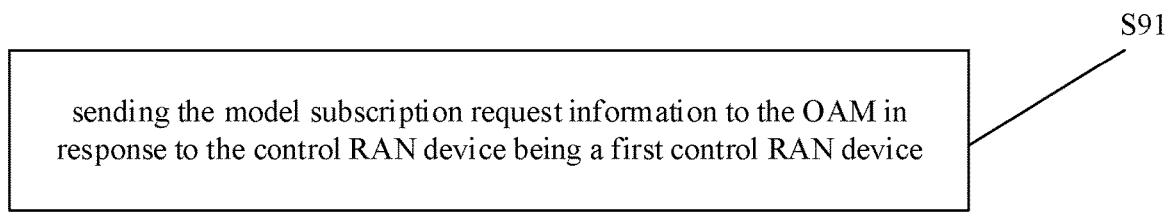
FIG. 11 is a flowchart illustrating another method for model inference according to an embodiment.

FIG. 11 is a flowchart illustrating a method for model inference according to an embodiment. As illustrated in FIG. 11, the method for model inference is applicable to a control RAN device. The method includes the following steps.

At step S91, the model subscription request information is sent to the OAM in response to the control RAN device being a first control RAN device.

In embodiments of the disclosure, the first control RAN device is a control RAN device corresponding to a first distributed RAN device accessed by the terminal. The first control RAN device receives the model analysis subscription request from the distributed RAN device, and generates model subscription request information based on its own AI capacity and the model analysis subscription request, and sends the model subscription request information to the OAM.

In some embodiments of the disclosure, due to mobility of the terminal, there may be a switch on the accessed distributed RAN device. In an implementation, the terminal makes a switch on the accessed distributed RAN device, without making a switch on the control RAN device.

Figure 12:
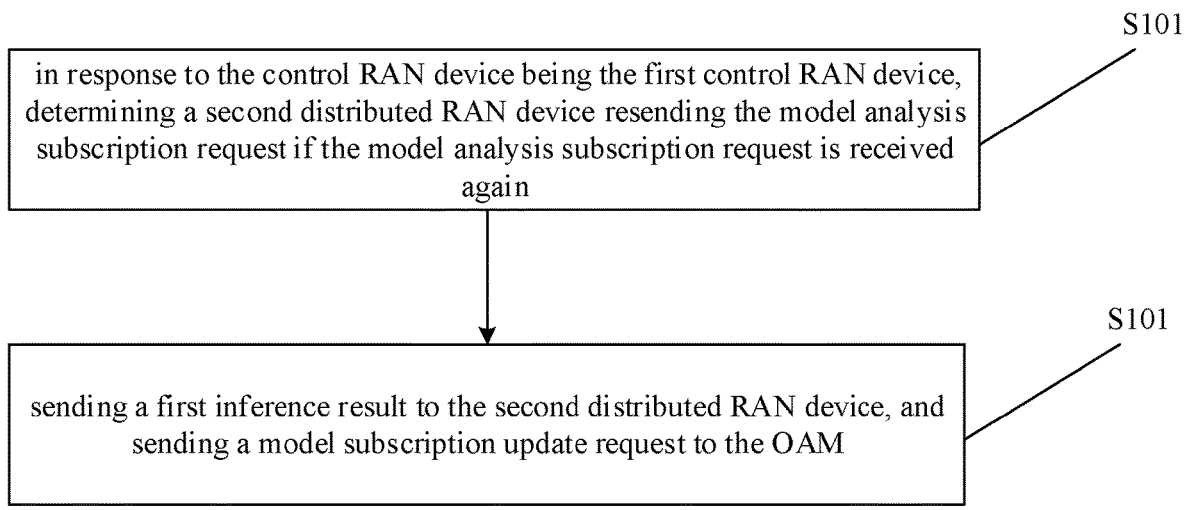
FIG. 12 is a flowchart illustrating another method for model inference according to an embodiment.

FIG. 12 is a flowchart illustrating a method for model inference according to an embodiment. As illustrated in FIG. 12, the method for model inference is applicable to a control RAN device. The method includes the following steps.

At step S101, in response to the control RAN device being the first control RAN device, a second distributed RAN device resending the model analysis subscription request is determined if the model analysis subscription request is received again.

In embodiments of the disclosure, the second distributed RAN device is a distributed RAN device re-accessed after the terminal makes a switch on the distributed RAN device.

In response to the first control RAN device receiving the model analysis subscription request again, it is determined that the distributed RAN device accessed by the terminal is switched, analysis subscription information of the terminal is updated and reported to the OAM. In an implementation, the first control RAN device does not complete an inference task of the first model, and when the first control RAN device (for example, a gNB-CU1) completes a current model inference task and obtains a first inference result, the first inference result is sent to the second distributed RAN device (for example, a gNB-DU2) based on an access location in an update analysis request message, and forwarded by the gNB-DU2 to the terminal.

At step S102, a first inference result is sent to the second distributed RAN device, and a model subscription update request is sent to the OAM.

In embodiments of the disclosure, the first control RAN device sends the first inference result to the second distributed RAN device, and sends the model subscription update request to the OAM, and requests the OAM to update analysis request information of the terminal.

For example, take the first control RAN device being a gNB-CU1, and the second distributed RAN device being a gNB-DU2 as an example. The gNB-CU1 updates analysis request information of the terminal. The gNB-CU1 reports the analysis request information of the terminal to the OAM, and the OAM updates the analysis request information of the terminal. In response to the current inference task being not completed when the terminal makes the switch, the gNB-CU1 completes the current model inference task to obtain the first inference result, and sends the first inference result to the gNB-DU2 based on the access location in the updated analysis request message, and the gNB-DU2 forwards the first inference result to the terminal.

In an implementation, the terminal switches to access a distributed RAN device, and switches the control RAN device, the implementation of which is as follows.

Figure 13:
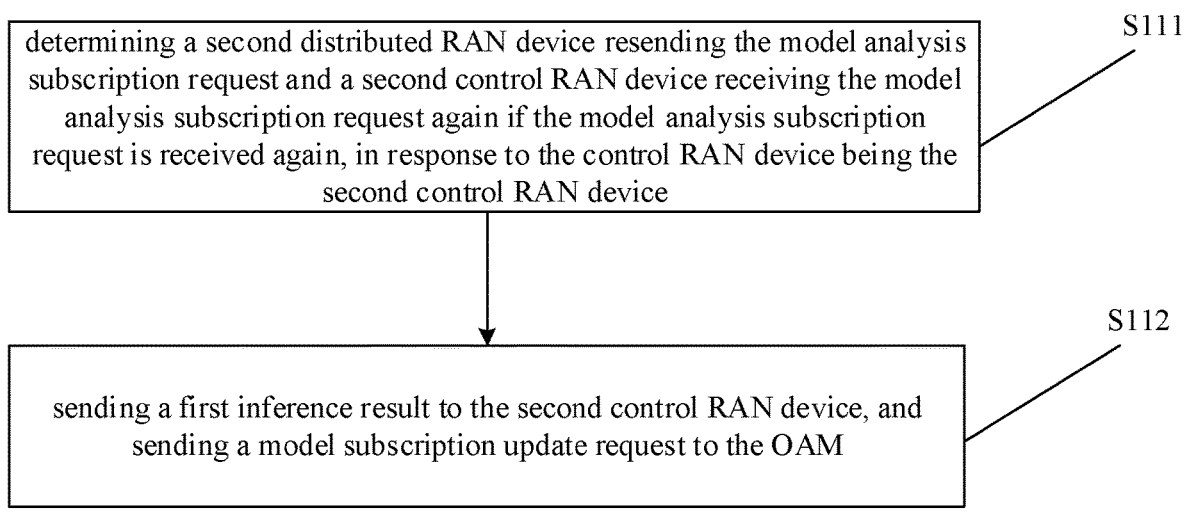
FIG. 13 is a flowchart illustrating another method for model inference according to an embodiment.

FIG. 13 is a flowchart illustrating a method for model inference according to an embodiment. As illustrated in FIG. 13, the method for model inference is applicable to a control RAN device. The method includes the following steps.

At step S111, a second distributed RAN device resending the model analysis subscription request and a second control RAN device receiving the model analysis subscription request again are determined if the model analysis subscription request is received again, in response to the control RAN device being the second control RAN device.

In embodiments of the disclosure, the second control RAN device is a control RAN device corresponding to the second distributed RAN device. The second distributed RAN device is a distributed RAN device re-accessed by the terminal after the terminal switches the distributed RAN device.

In response to the control RAN device re-receiving the model analysis subscription request from the distributed RAN device, and the control RAN device re-receiving the model analysis subscription request being the second control RAN device, the second control RAN device re-accessed by the terminal is determined.

At step S112, a first inference result is sent to the second control RAN device, and a model subscription update request is sent to the OAM.

In embodiments of the disclosure, the first control RAN device sends the first inference result to the second control RAN device, and is no longer responsible for an analysis request of the terminal. And the first control RAN device sends the model subscription update request to the OAM.

For example, take the second control RAN device being a gNB-CU2, and the second distributed RAN device being a gNB-DU3 as an example. The gNB-CU2 sends a model subscription request to the OAM, including AI processing capacity information of the gNB-CU2 and analysis subscription request information of the terminal. The OAM updates the analysis subscription request information of the terminal based on the model subscription request, and sends updated analysis subscription request information to a source base station gNB-CU1. In response to the current inference task being not completed when the terminal makes the switch, the gNB-CU1 completes the inference task to obtain the first inference result, and sends the first inference result to the gNB-CU2 based on an access location in the updated analysis request message. The gNB-CU1 updates the analysis request information of the terminal, and is no longer responsible for tasks related to the analysis request of the terminal. The gNB-CU2 sends the first inference result to the gNB-DU3, and the gNB-DU3 forwards the first inference result to the terminal. The OAM re-segments the model based on AI processing capacity information in the model subscription request of the gNB-CU2, and sends the first model segmentation block to the gNB-CU2 initiating the request and sends remaining model segmentation blocks to other gNB-CUs, and sends allocation information of model segmentation blocks to the gNB-CUs participating in joint inference.

In the method for model inference provided in the disclosure, it is ensured that a source distributed RAN device smoothly feeds back a current first inference result to the terminal that has made the switch, and the newly accessed distributed RAN device takes over the model inference task quickly, thereby avoiding that the AI analysis service required by the terminal is interrupted in a switch process, which guarantees continuity and accuracy of the AI analysis service of the mobile terminal.

Figure 14:
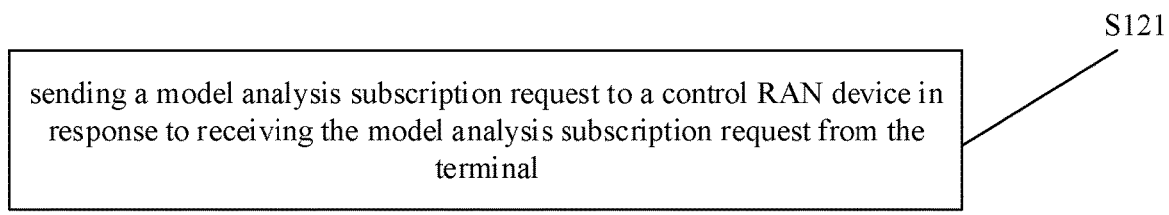
FIG. 14 is a flowchart illustrating another method for model inference according to an embodiment.

FIG. 14 is a flowchart illustrating a method for model inference according to an embodiment. As illustrated in FIG. 14, the method for model inference is applicable to a distributed RAN device. The method includes the following steps.

At step S121, a model analysis subscription request is sent to a control RAN device in response to receiving the model analysis subscription request from the terminal.

In embodiments of the disclosure, the model analysis subscription request is configured to acquire a first model from the OAM. The first model includes a first number of model segmentation blocks.

The terminal initiates a model analysis subscription request to an accessed distributed RAN device. The model analysis subscription request includes an identifier of the terminal, an analysis request type and access location information. The distributed RAN device sends the model analysis subscription request to the control RAN device after receiving the model analysis subscription request.

Figure 15:
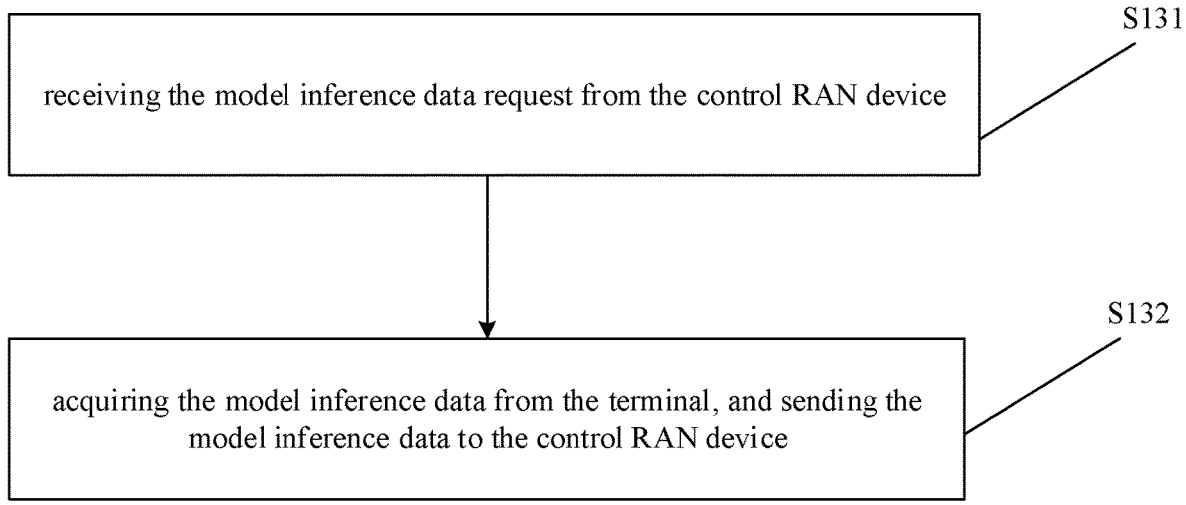
FIG. 15 is a flowchart illustrating another method for model inference according to an embodiment.

FIG. 15 is a flowchart illustrating a method for model inference according to an embodiment. As illustrated in FIG. 15, the method for model inference is applicable to a distributed RAN device. The method includes the following steps.

At step S131, the model inference data request from the control RAN device is received.

At step S132, the model inference data is acquired from the terminal, and sent to the control RAN device.

In embodiments of the disclosure, the model inference data request is configured to acquire model inference data. The distributed RAN device acquires the model inference data from the terminal after receiving the model analysis subscription request, and sends the model inference data to the control RAN device.

Figure 16:
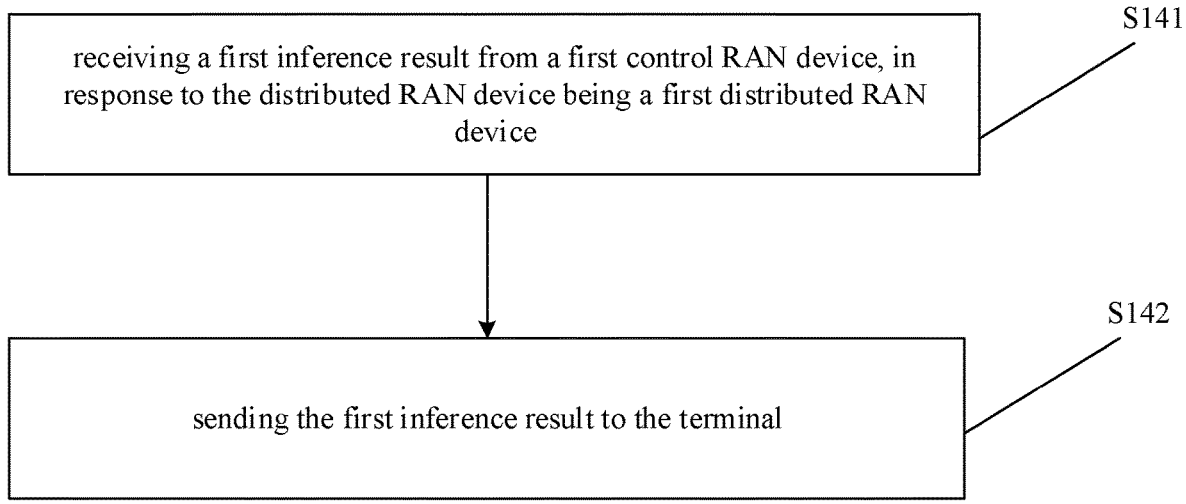
FIG. 16 is a flowchart illustrating another method for model inference according to an embodiment.

FIG. 16 is a flowchart illustrating a method for model inference according to an embodiment. As illustrated in FIG. 16, the method for model inference is applicable to a distributed RAN device. The method includes the following steps.

At step S141, a first inference result from a first control RAN device is received, in response to the distributed RAN device being a first distributed RAN device.

At step S142, the first inference result is sent to the terminal.

In embodiments of the disclosure, the first distributed RAN device accessed by the terminal receives the first inference result from the first control RAN device, and sends the first inference result to the terminal, so that the terminal adjusts an execution strategy.

Figure 17:
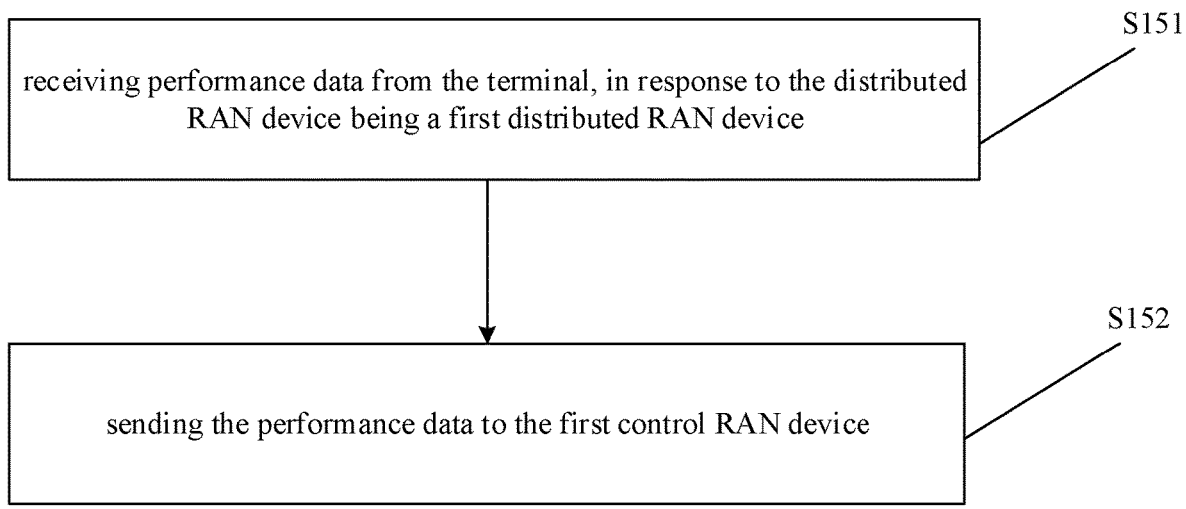
FIG. 17 is a flowchart illustrating another method for model inference according to an embodiment.

FIG. 17 is a flowchart illustrating a method for model inference according to an embodiment. As illustrated in FIG. 17, the method for model inference is applicable to a distributed RAN device. The method includes the following steps.

At step S151, performance data from the terminal is received, in response to the distributed RAN device being a first distributed RAN device.

In embodiments of the disclosure, the performance data is real performance data after the terminal adjusts an execution strategy based on the first model.

At step S152, the performance data is sent to the first control RAN device.

In embodiments of the disclosure, the terminal sends real performance data (which may be referred to performance feedback data) obtained after adjusting the execution strategy to the accessed first distributed RAN device. And the performance data is sent to the first control RAN device corresponding to the first distributed RAN device.

Figure 18:
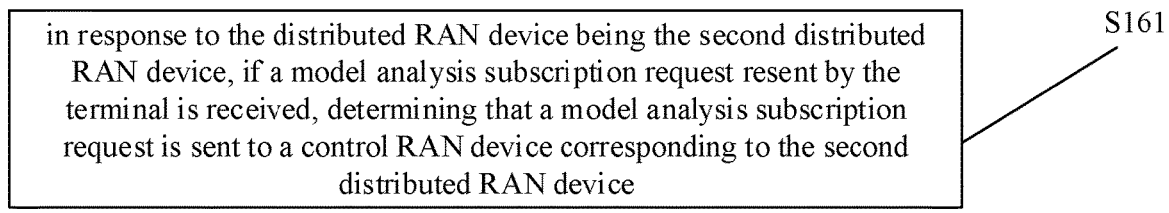
FIG. 18 is a flowchart illustrating another method for model inference according to an embodiment.

FIG. 18 is a flowchart illustrating a method for model inference according to an embodiment. As illustrated in FIG. 18, the method for model inference is applicable to a distributed RAN device. The method includes the following steps.

At step S161, in response to the distributed RAN device being the second distributed RAN device, if a model analysis subscription request resent by the terminal is received, it is determined that the model analysis subscription request is sent to a control RAN device corresponding to the second distributed RAN device.

In embodiments of the disclosure, the second distributed RAN device is a distributed RAN device re-accessed by the terminal after the terminal switches the distributed RAN device.

After switching the accessed distributed RAN device, the terminal resends the model analysis subscription request to the re-accessed distributed RAN device. The model analysis subscription request is sent to a corresponding control RAN device, in response to the distributed RAN device receiving the model analysis subscription request being the second distributed RAN device, that is, the distributed RAN device re-accessed by the terminal.

Figure 19:
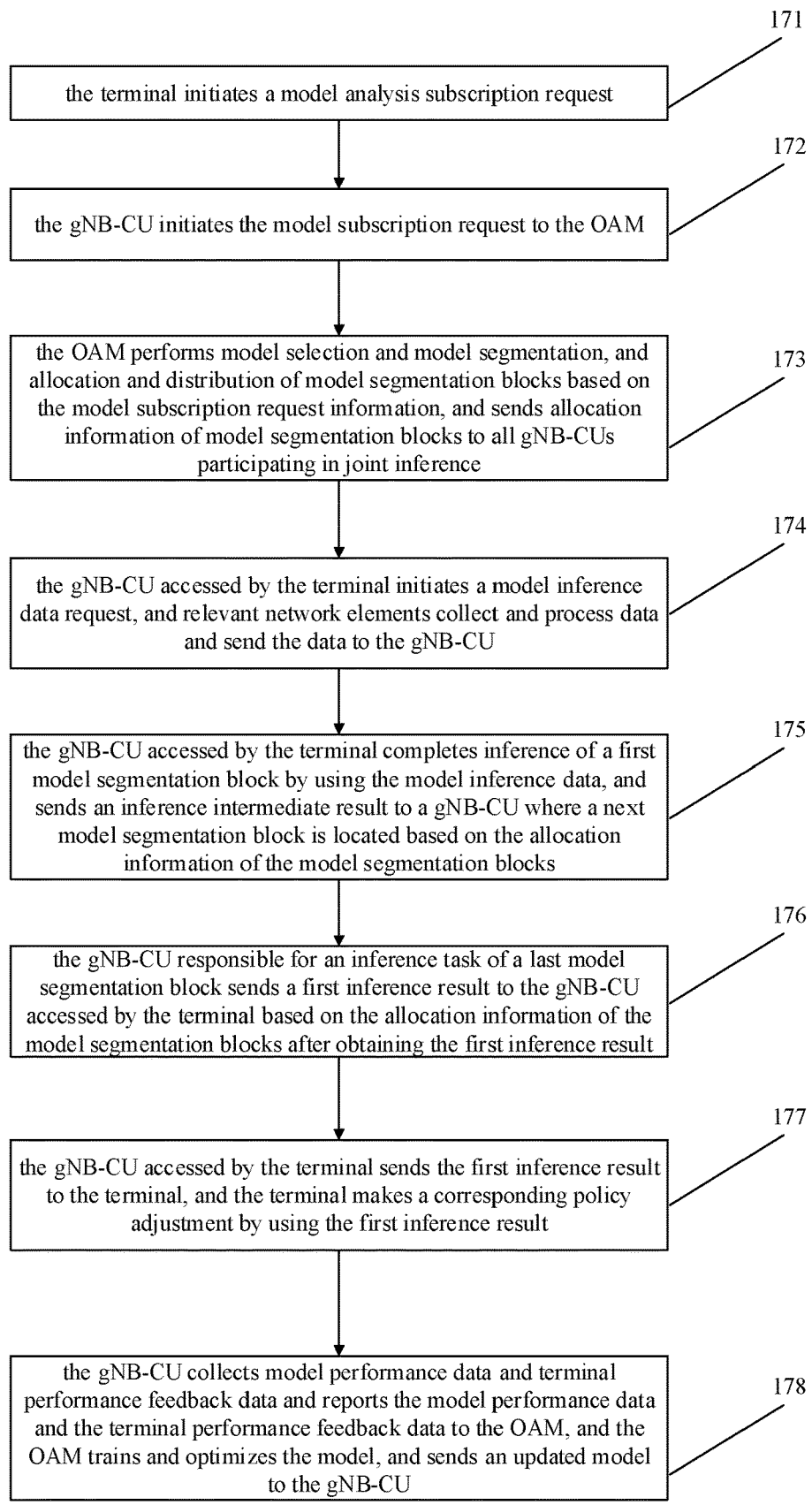
FIG. 19 is a flowchart illustrating another method for model inference according to an embodiment.

In some embodiments of the disclosure, it is further illustrated by taking an interaction process among the OAM, the control RAN device and the distributed RAN device as an example. The control RAN device may be a gNB-CU, and the distributed RAN device may be a gNB-DU. FIG. 19 is a flowchart illustrating a method for model inference according to an embodiment. As illustrated in FIG. 19, the method includes the following steps.

At step 171, the terminal initiates a model analysis subscription request.

At step 172, the gNB-CU initiates the model subscription request to the OAM.

At step 173, the OAM performs model selection and model segmentation, and allocation and distribution of model segmentation blocks based on the model subscription request information, and sends allocation information of model segmentation blocks to all gNB-CUs participating in joint inference.

At step 174, the gNB-CU accessed by the terminal initiates a model inference data request, and relevant network elements collect and process data and send the data to the gNB-CU.

At step 175, the gNB-CU accessed by the terminal completes inference of a first model segmentation block by using the model inference data, and sends an inference intermediate result to a gNB-CU where a next model segmentation block is located based on the allocation information of the model segmentation blocks.

At step 176, the gNB-CU responsible for an inference task of a last model segmentation block sends a first inference result to the gNB-CU accessed by the terminal based on the allocation information of the model segmentation blocks after obtaining the first inference result.

At step 177, the gNB-CU accessed by the terminal sends the first inference result to the terminal, and the terminal makes a corresponding policy adjustment by using the first inference result.

At step 178, the gNB-CU collects model performance data and terminal performance feedback data and reports the model performance data and the terminal performance feedback data to the OAM, and the OAM trains and optimizes the model, and sends an updated model to the gNB-CU.

Figure 20:
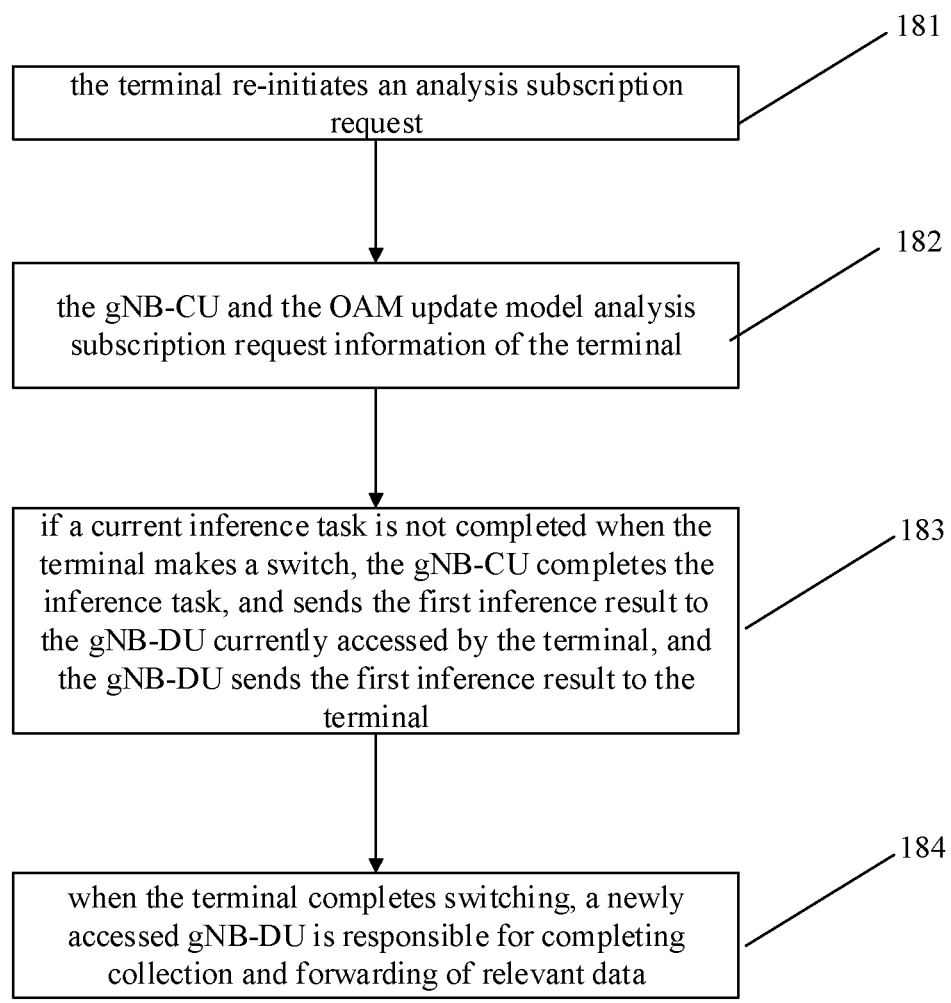
FIG. 20 is a flowchart illustrating a terminal switch in a method for model inference according to an embodiment.

In some embodiments of the disclosure, due to mobility of the terminal, there may be a switch on the distributed RAN device accessed by the terminal. In an implementation, the terminal makes a switch on the accessed distributed RAN device, without making a switch on the control RAN device. FIG. 20 is a flowchart illustrating switching of a terminal in a method for model inference according to an embodiment. As illustrated in FIG. 20, it includes the following steps.

At step 181, the terminal re-initiates an analysis subscription request.

At step 182, the gNB-CU and the OAM update model analysis subscription request information of the terminal.

At step 183, if a current inference task is not completed when the terminal makes a switch, the gNB-CU completes the inference task, and sends the first inference result to the gNB-DU currently accessed by the terminal, and the gNB-DU sends the first inference result to the terminal.

At step 184, when the terminal completes switching, a newly accessed gNB-DU is responsible for completing collection and forwarding of relevant data.

Figure 21:
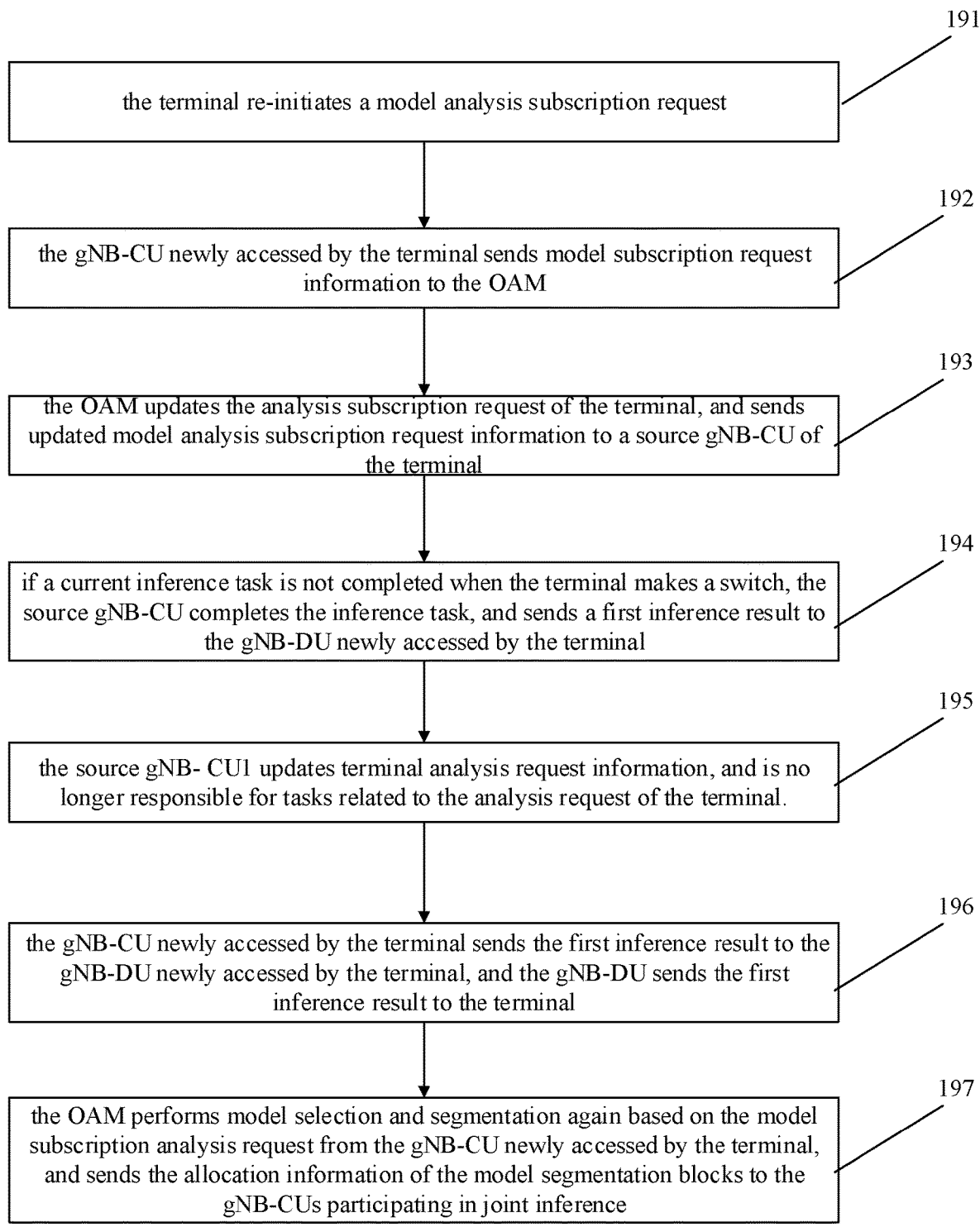
FIG. 21 is a flowchart illustrating a terminal switch in a method for model inference according to an embodiment.

In some embodiments of the disclosure, due to mobility of the terminal, there may be a switching on the distributed RAN device accessed by the terminal. In an implementation, the terminal makes the switch on the accessed distributed RAN device, and makes the switch on the control RAN device. FIG. 21 is a flowchart illustrating switching of a terminal in a method for model inference according to an embodiment. As illustrated in FIG. 21, it includes the following steps.

At step 191, the terminal re-initiates a model analysis subscription request.

At step 192, the gNB-CU newly accessed by the terminal sends model subscription request information to the OAM.

At step 193, the OAM updates the analysis subscription request of the terminal, and sends updated model analysis subscription request information to a source gNB-CU of the terminal.

At step 194, if a current inference task is not completed when the terminal made the switching, the source gNB-CU completes the inference task, and sends a first inference result to the gNB-DU newly accessed by the terminal.

At step 195, the source gNB-CU1 updates terminal analysis request information, and is no longer responsible for tasks related to the analysis request of the terminal.

At step 196, the gNB-CU newly accessed by the terminal sends the first inference result to the gNB-DU newly accessed by the terminal, and the gNB-DU sends the first inference result to the terminal.

At step 197, the OAM performs model selection and segmentation again based on the model subscription analysis request from the gNB-CU newly accessed by the terminal, and sends the allocation information of the model segmentation blocks to the gNB-CUs participating in joint inference.

Figure 22:
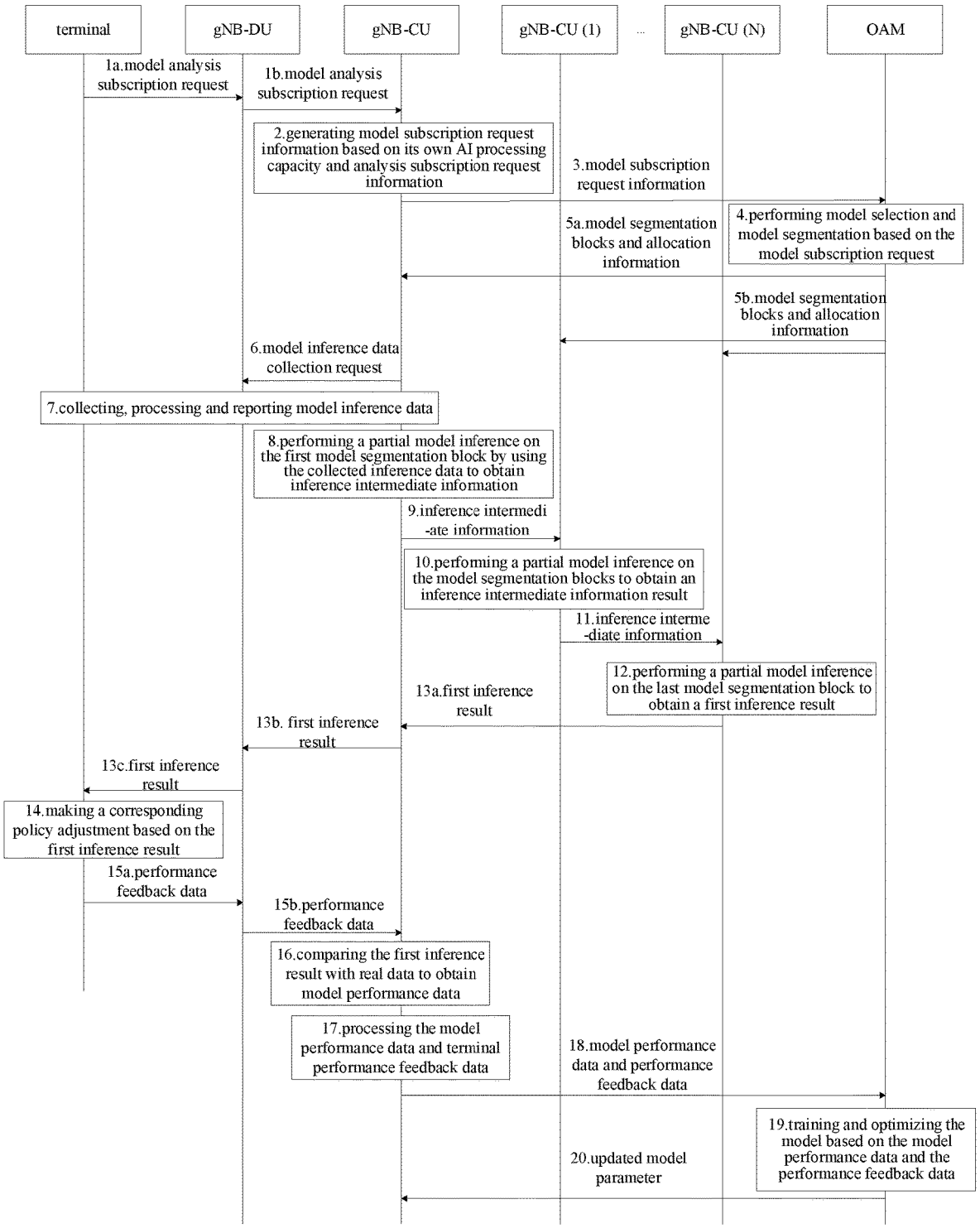
FIG. 22 is a principle diagram illustrating a protocol and an interface of a method for model inference according to an embodiment.

FIG. 22 is a principle diagram illustrating a protocol and an interface of a method for model inference according to an embodiment. As illustrated in FIG. 22, it mainly relates to the terminal, the gNB-DU accessed by the terminal, the gNB-CU accessed by the terminal, other gNB-CUs (gNB-CU (1)~gNB-CU(N)) participating in joint inference and the OAM provided in embodiments of the disclosure. The specific process is as follows:

1a. The terminal sends a model analysis subscription request signaling to the gNB-DU, to indicate initiating a model analysis subscription request to a receiver. 1b. The gNB-DU sends the analysis subscription request signaling to the gNB-CU. 2. The gNB-CU generates model subscription request information based on its own AI processing capacity and analysis subscription request information. 3. The gNB-CU sends the model subscription request signaling to the OAM, to indicate initiating a model subscription request to the receiver. 4. The OAM selects a first model that meets the analysis request based on model subscription information, and segments the model into several blocks based on the AI processing capacity information. 5a. The OAM sends the first model segmentation block and allocation information of model segmentation blocks to a gNB-CU accessed by the terminal. 5b. The OAM sends remaining model segmentation blocks and allocation information of model segmentation blocks to other gNB-CUs participating in joint inference, to indicate to send the allocation information of model segmentation blocks. 6. The gNB-CU sends a model inference data collection request signaling to the gNB-DU, to indicate initiating the model inference data collection request to the receiver. 7. The gNB-DU, the terminal and the gNB-CU respectively collect data based on the model inference data collection request and send the data to the gNB-CU. 8. The gNB-CU performs a partial model inference on the first model segmentation block by using the collected inference data to obtain inference intermediate information. 9. The gNB-CU sends the inference intermediate information to a gNB-CU (1) where a next model segmentation block is located. 10. The gNB-CU (1) performs a partial model inference on the model segmentation blocks to obtain an inference intermediate information result. 11. The gNB-CU (1) sends the inference intermediate information to a gNB-CU where a next model segmentation block is located, until a gNB-CU (N) where a last model segmentation block is located receives all inference intermediate information. 12. The gNB-CU (N) performs a partial model inference on the last model segmentation block to obtain a first inference result. 13a. The gNB-CU (N) sends the first inference result to a gNB-CU accessed by the terminal. 13b. The gNB-CU sends the first inference result to a gNB-DU accessed by the terminal. 13c. The gNB-DU sends the first inference result to the terminal. 14. The terminal makes a corresponding policy adjustment based on the first inference result. 15a. The terminal sends performance feedback data to the gNB-DU. 15b. The gNB-DU sends the performance feedback data to the gNB-CU. 16. The gNB-CU compares the first inference result with real data to obtain model performance data. 17. The gNB-CU processes the model performance data and terminal performance feedback data. 18. The gNB-CU sends the model performance data and the terminal performance feedback data to the OAM. 19. The OAM trains and optimizes the model based on the model performance data and the performance feedback data. 20. The OAM sends an updated model parameter to the gNB-CU.

Figure 23:
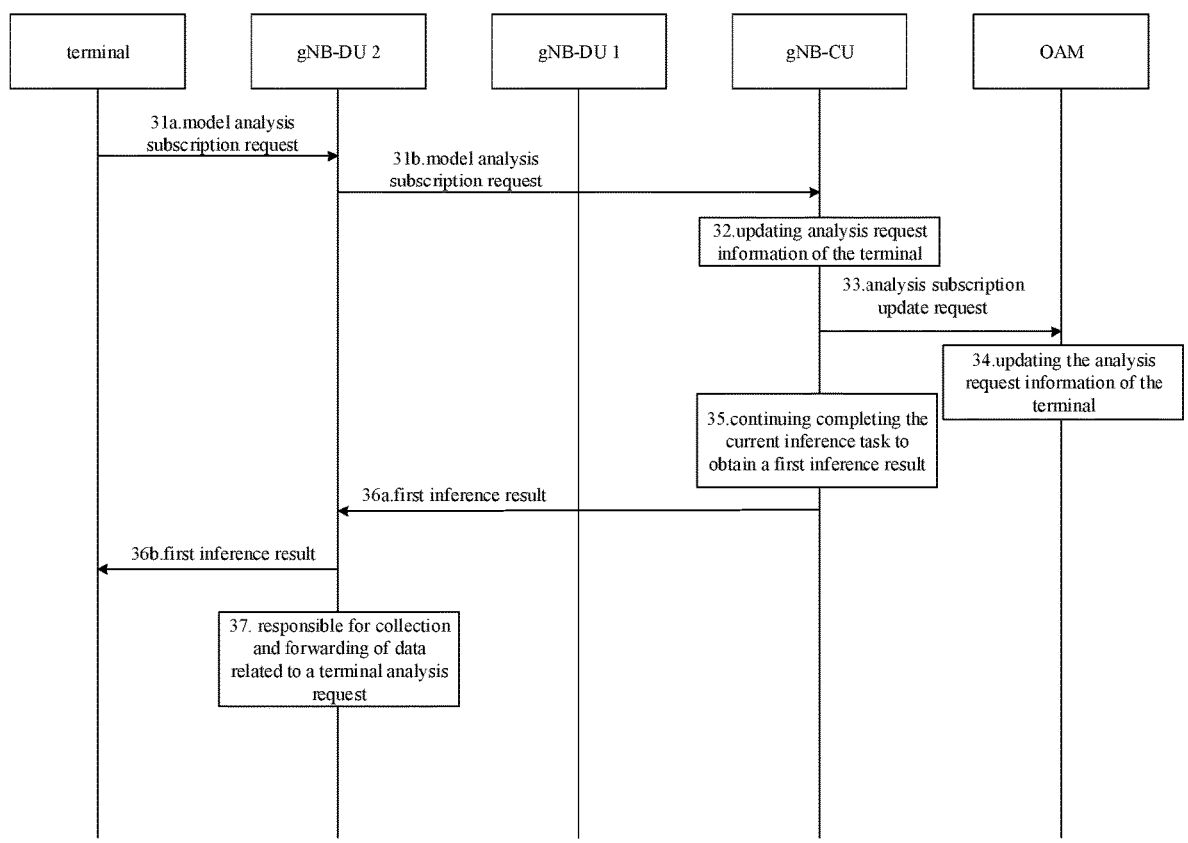
FIG. 23 is a principle diagram illustrating a protocol and an interface of AI analysis task delivery when a terminal makes a switch under a same gNB-CU in a method for model-free inference according to an embodiment.

FIG. 23 is a principle diagram illustrating a protocol and an interface of AI analysis task delivery when the terminal makes a switching under the same gNB-CU in a method for model-free inference according to an embodiment. As illustrated in FIG. 23, it mainly relates to a terminal, a source gNB-DU (a gNB-DU 1) of the terminal, a gNB-DU (a gNB-DU 2) newly accessed by the terminal, a gNB-CU accessed by the terminal and an OAM. The specific process is as follows:

31a. The terminal sends a model analysis subscription request signaling to the gNB-DU 2. 31b. The gNB-DU 2 sends the model analysis subscription request signaling to the gNB-CU. 32. The gNB-CU updates analysis request information of the terminal. 33. The gNB-CU sends the analysis subscription update request to the OAM. 34. The OAM updates analysis request information of the terminal. 35. If a current inference task is not completed when the terminal makes the switching, the gNB-CU continues completing the current inference task to obtain a first inference result. 36a. The gNB-CU sends the first inference result to the gNB-DU 2 based on an access location in the analysis subscription update request. 36b. The gNB-DU 2 sends the first inference result to the terminal. 37. When the terminal completes switching, the gNB-DU 2 is responsible for collection and forwarding of data related to the terminal analysis request.

Figure 24:
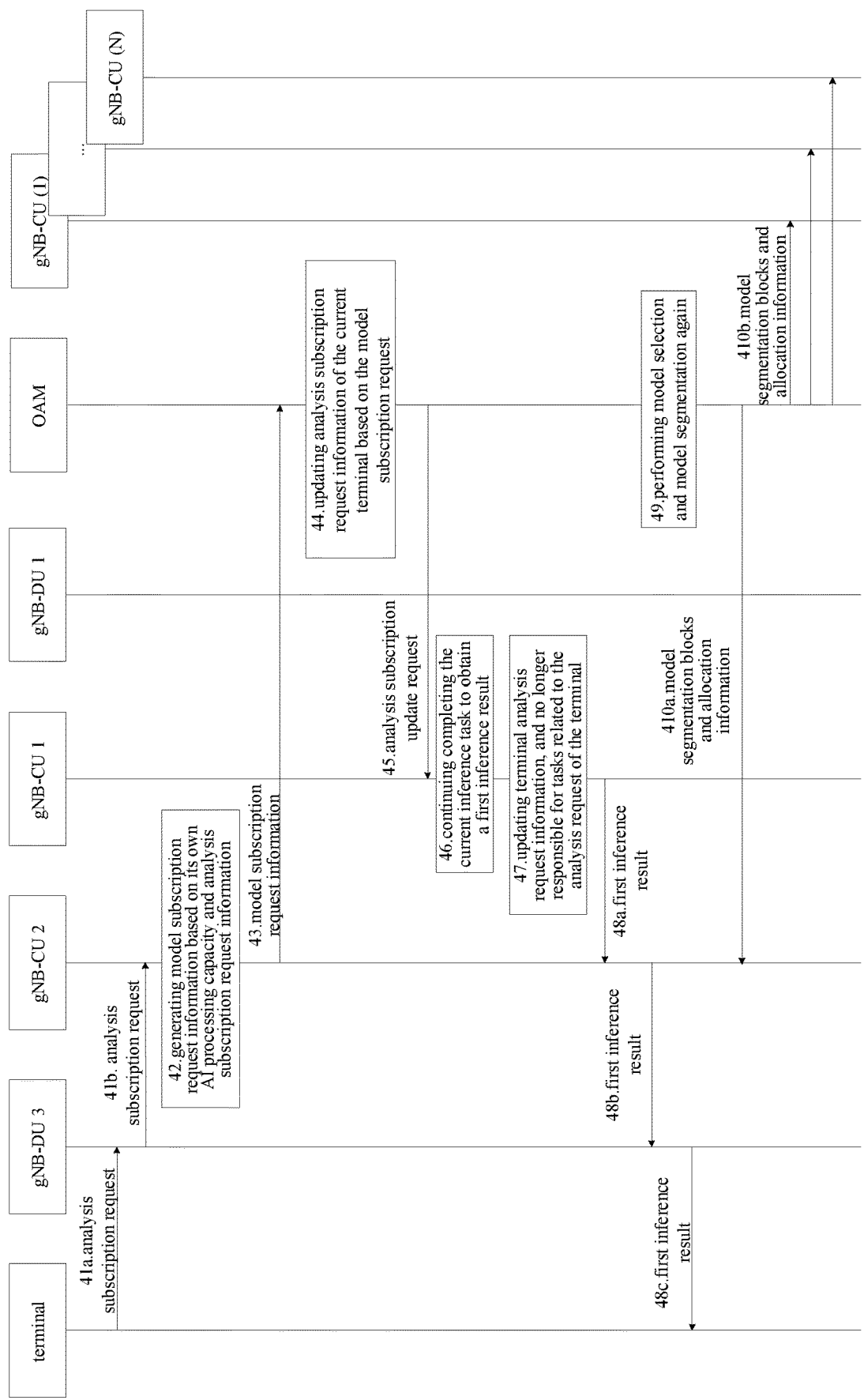
FIG. 24 is a principle diagram illustrating a protocol and an interface of AI analysis task delivery when a terminal makes a switch across gNB-CUs in a method for model-free inference according to an embodiment.

FIG. 24 is a principle diagram illustrating a protocol and an interface of AI analysis task delivery when the terminal makes a switch across gNB-CUs in a method for model-free inference according to an embodiment. As illustrated in FIG. 24, it mainly relates to a terminal, a source gNB-DU (a gNB-DU 1) of the terminal, a gNB-DU (a gNB-DU 3) newly accessed by the terminal, a source gNB-CU (a gNB-CU 1) of the terminal, a gNB-CU (a gNB-CU 2) newly accessed by the terminal, other gNB-CUs (gNB-CU (1)~gNB-CU(N)) participating in joint inference, and an OAM. The specific process is as follows:

41a. The terminal sends the model analysis subscription request signaling to the gNB-DU 3. 41b. The gNB-DU 3 sends the model analysis subscription request signaling to the gNB-CU 2. 42. The gNB-CU 2 generates model subscription request information based on its own AI processing capacity and analysis subscription request information. 43. The gNB-CU 2 sends the model subscription request signaling to the OAM. 44. The OAM updates current analysis subscription request information of the terminal based on the model subscription request. 45. The terminal sends an analysis subscription update request to the gNB-CU 1, to indicate initiating the analysis subscription update request to the receiver. 46. If the current inference task is not completed when the terminal makes the switching, the gNB-CU 1 continues completing the current inference task to obtain a first inference result. 47. The gNB-CU 1 updates terminal analysis request information, and is no longer responsible for tasks related to the analysis request of the terminal. 48a. The gNB-CU 1 sends the first inference result to the gNB-CU 2 based on the access location in the analysis subscription update request. 48*b*. The gNB-CU 2 sends the first inference result to the gNB-DU 3. 48*c*. The gNB-DU 3 sends the first inference result to the terminal. 49. The OAM performs model selection and model segmentation again based on the AI processing capacity information in the model subscription request. 410*a*. The OAM sends the first model segmentation block and the allocation information of model segmentation blocks to the gNB-CU 2. 410*b*. The OAM sends remaining model segmentation blocks and the allocation information of model segmentation blocks to gNB-CUs assisting in inference.

Based on the same conception, an apparatus for model inference is further provided in embodiments of the present disclosure.

It may be understood that, the apparatus for model inference provided in embodiments of the present disclosure includes hardware structures and/or software modules that perform corresponding functions in order to achieve the above functions. In combination with modules and algorithm steps of examples described in embodiments of the present disclosure, the embodiments of the present disclosure may be implemented in the form of a hardware or a combination of a hardware and a computer software. Whether a certain function is executed by a hardware or a computer software driving a hardware depends on specific applications and design constraints of the technical solution. Those skilled in the art may adopt different methods for each specific application to implement the described functions, but such implementation should not be considered as beyond the scope of the technical solutions in embodiments of the present disclosure.

Figure 25:
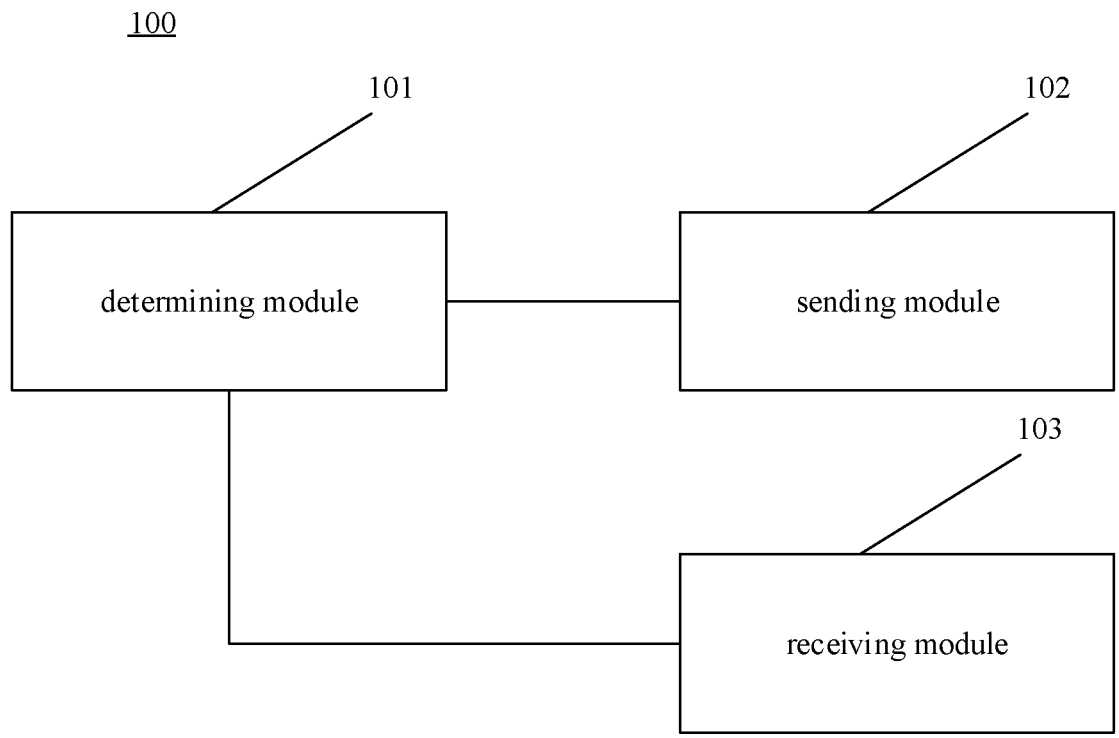
FIG. 25 is a block diagram illustrating an apparatus for model inference according to an embodiment.

FIG. 25 is a block diagram illustrating an apparatus for model inference according to an embodiment. As illustrated in FIG. 25, the apparatus 100 for model inference is applicable to an OAM entity, and includes a determining module 101 and a sending module 102.

The determining module 101 is configured to determine a first model corresponding to model subscription request information in response to receiving the model subscription request information from a control radio access network (RAN) device. The sending module 102 is configured to obtain a first number of model segmentation blocks by segmenting the first model, and distribute the first number of model segmentation blocks to a first number of control RAN devices.

In embodiments of the present disclosure, each of the first number of model segmentation blocks correspondingly has allocation information.

The allocation information includes an inference sequence of the first number of model segmentation blocks, and the control RAN device corresponding to each of the first number of model segmentation blocks.

In embodiments of the disclosure, the first number of control RAN devices include a first control RAN device, and the first control RAN device is a control RAN device accessed by a terminal.

The sending module 102 is configured to determine a plurality of auxiliary control RAN devices from control RAN devices adjacent to the first control RAN device; determine a second number of control RAN devices from the plurality of auxiliary control RAN devices based on a computing power occupation state and a load of each of the plurality of auxiliary control RAN devices, in which the second number of control RAN devices are control RAN devices in the first number of control RAN devices other than the first control RAN device; and send a first model segmentation block to the first control RAN device and distribute a remaining number of model segmentation blocks to the second number of control RAN devices, based on the inference sequence of the first number of model segmentation blocks.

In embodiments of the present disclosure, the apparatus for model inference further includes a receiving module 103.

The receiving module 103 is configured to receive model performance update data from the first control RAN device. The first model is updated based on the model performance update data, an updated model parameter of the first model is determined, and the updated model parameter of the first model is sent to the first control RAN device.

In embodiments of the present disclosure, the receiving module 103 is further configured to update a distributed RAN device accessed by the terminal in response to receiving a first model analysis subscription update request. The first model analysis subscription update request indicates that the terminal makes a switch on the distributed RAN device without making a switching on the control RAN device. Alternatively, the receiving module 103 is further configured to update a distributed RAN device accessed by the terminal and re-segment the first model, in response to receiving a second model analysis subscription update request. The second model analysis subscription update request indicates that the terminal makes a switch on the distributed RAN device and makes a switch on the control RAN device.

Figure 26:
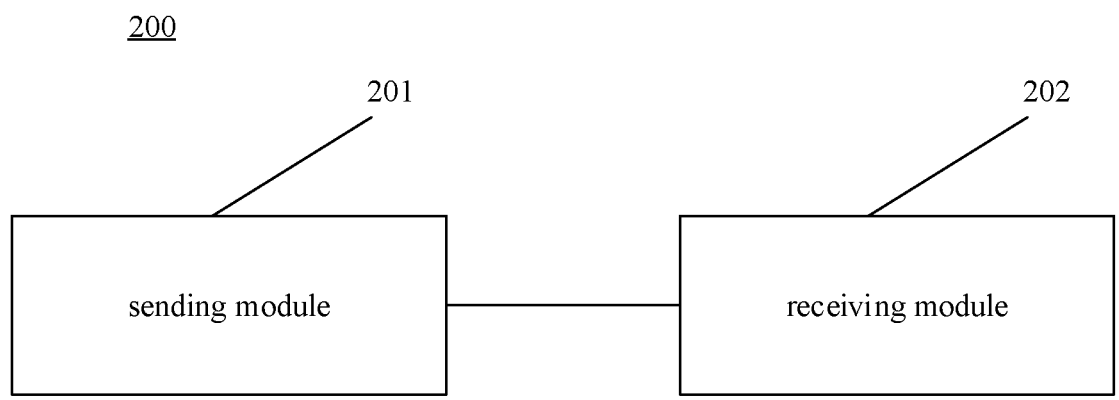
FIG. 26 is a block diagram illustrating another apparatus for model inference according to an embodiment.

FIG. 26 is a block diagram illustrating an apparatus for model inference according to an embodiment. As illustrated in FIG. 26, the apparatus 200 for model inference is applicable to a control RAN device, and includes a sending module 201 and a receiving module 202.

The sending module 201 is configured to obtain model subscription request information by processing a model analysis subscription request in response to receiving the model analysis subscription request from a distributed RAN device, and send the model subscription request information to an OAM. The receiving module 202 is configured to receive model segmentation blocks from the OAM. The model segmentation blocks are model segmentation blocks determined by segmenting the first model. The first model is determined by the OAM based on the model subscription request information.

In embodiments of the disclosure, the sending module 201 is further configured to send a model inference data request to the distributed RAN device, in which the model inference data request is configured to acquire model inference data. Inference intermediate information of the model segmentation block is obtained by inferring the model segmentation block based on the model inference data.

In embodiments of the present disclosure, each model segmentation block correspondingly has allocation information. The allocation information includes an inference sequence of the first number of model segmentation blocks, and the control RAN device corresponding to each of the first number of model segmentation blocks.

The sending module 201 is further configured to send inference intermediate information to a next control RAN based on the inference sequence, in response to the control RAN device being not a last control RAN device. Alternatively, the sending module 201 is further configured to determine a first inference result corresponding to the first model after the model inference is completed, and send the first inference result to a first control RAN device, in response to the control RAN device being the last control RAN device. The first control RAN device is a control RAN device accessed by the terminal.

In embodiments of the disclosure, the sending module 201 is further configured to receive the first inference result in response to the control RAN device being a first control RAN device. The sending module 201 is further configured to send the first inference result to a first distributed RAN device. The first distributed RAN device is a distributed RAN device accessed by the terminal.

In embodiments of the disclosure, after the first inference result is sent to the first distributed RAN device, the receiving module 202 is further configured to receive performance data from the first distributed RAN device. The performance data is real performance data after the terminal adjusts an execution strategy based on the first model. And the receiving module 202 obtains model performance update data by processing the performance data, and sends the model performance update data to the OAM.

In embodiments of the disclosure, the sending module 201 is further configured to send the model subscription request information to the OAM in response to the control RAN device being a first control RAN device. The first control RAN device is a control RAN device corresponding to a first distributed RAN device accessed by the terminal.

In embodiments of the disclosure, the sending module 201 is further configured to determine a second distributed RAN device resending the model analysis subscription request if the model analysis subscription request is received again, in response to the control RAN device being the first control RAN device. The second distributed RAN device is a distributed RAN device re-accessed after the terminal makes a switch on the distributed RAN device. And the sending module 201 sends a first inference result to the second distributed RAN device, and sends a model subscription update request to the OAM.

In embodiments of the disclosure, the sending module 201 is further configured to determine the second distributed RAN device resending the model analysis subscription request and a second control RAN device receiving the model analysis subscription request again, if the model analysis subscription request is received again, in response to the control RAN device being the second control RAN device. The second control RAN device is a control RAN device corresponding to the second distributed RAN device. The second distributed RAN device is a distributed RAN device re-accessed after the terminal makes a switch on the distributed RAN device. And the sending module 201 sends the first inference result to the second control RAN device, and sends the model subscription update request to the OAM.

Figure 27:
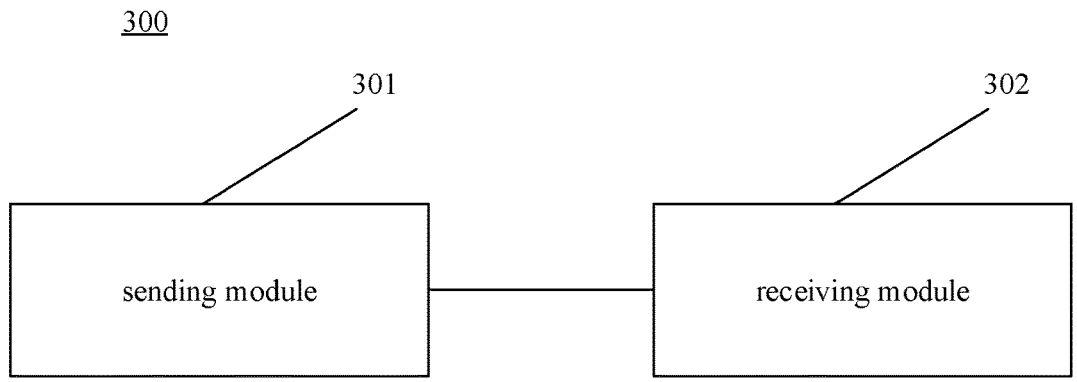
FIG. 27 is a block diagram illustrating another apparatus for model inference according to an embodiment.

FIG. 27 is a block diagram illustrating an apparatus for model inference according to an embodiment. As illustrated in FIG. 27, the apparatus 300 for model inference is applicable to a distributed RAN device, and includes a sending module 301.

The sending module 301 is configured to send a model analysis subscription request to a control RAN device in response to receiving the model analysis subscription request from a terminal. The model analysis subscription request is configured to acquire a first model from the OAM. The first model includes a first number of model segmentation blocks.

In embodiments of the present disclosure, the apparatus further includes a receiving module 302.

The receiving module 302 is configured to receive a model inference data request from the control RAN device. The model inference data request is configured to acquire model inference data. And the receiving module 302 acquires the model inference data, and sends the model inference data to the control RAN device.

In embodiments of the present disclosure, the receiving module 302 is further configured to receive a first inference result from a first control RAN device, in response to the distributed RAN device being a first distributed RAN device. And the receiving module 302 sends the first inference result to the terminal.

In embodiments of the disclosure, the receiving module 302 is further configured to receive performance data from the terminal, in response to the distributed RAN device being a first distributed RAN device. The performance data is real performance data after the terminal adjusts an execution strategy based on the first model. And the receiving module 302 sends the performance data to the first control RAN device.

In embodiments of the disclosure, the receiving module 302 is further configured to determine that a model analysis subscription request is sent to a control RAN device corresponding to a second distributed RAN device, if the model analysis subscription request resent by the terminal is received, in response to the distributed RAN device being the second distributed RAN device. The second distributed RAN device is a distributed RAN device re-accessed after the terminal switches the distributed RAN device.

With regards to the apparatus in the above embodiments, the specific way in which each module performs the operation has been described in embodiments of the method and will not be elaborated here.

Figure 28:
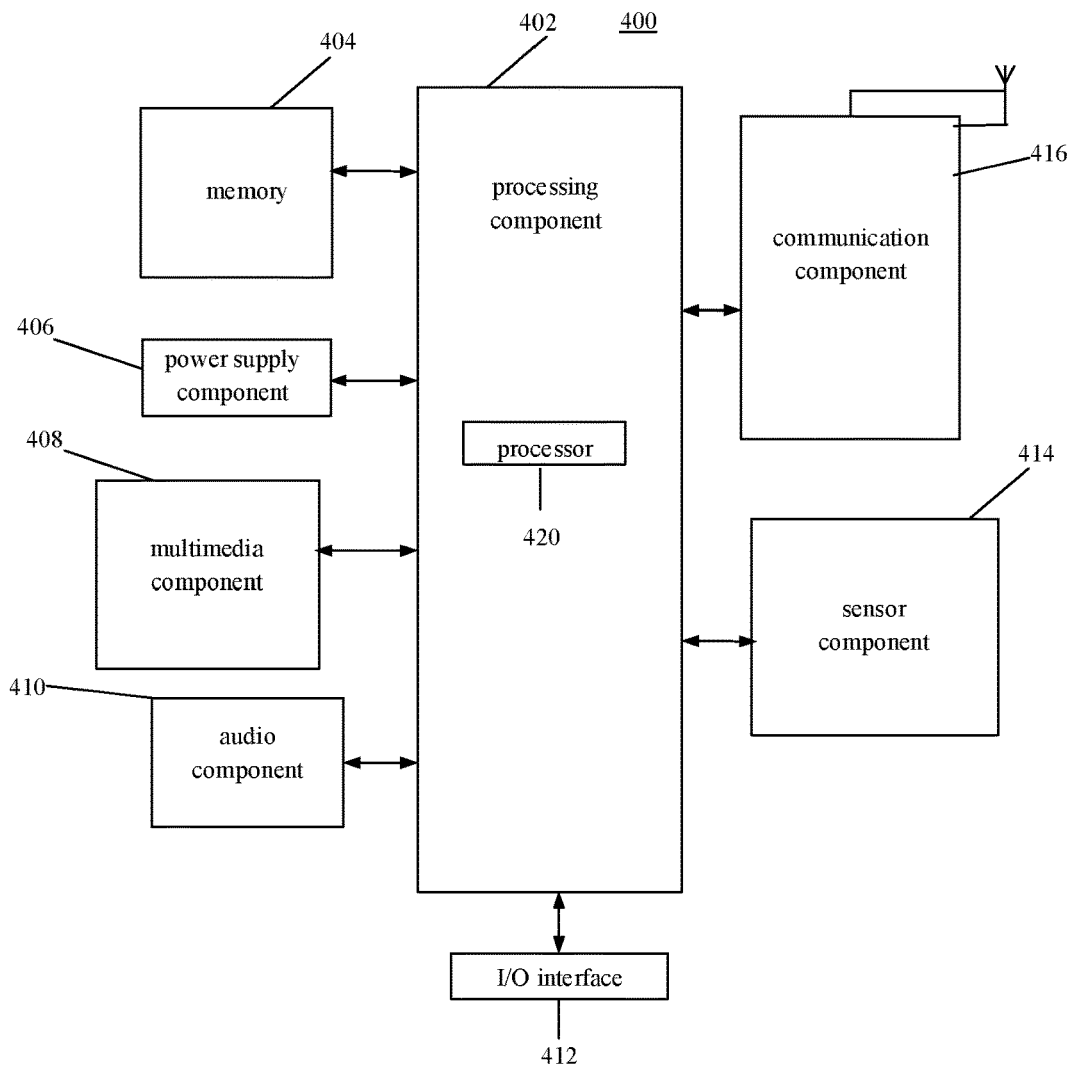
FIG. 28 is a block diagram illustrating a device for model inference according to an embodiment.

FIG. 28 is a block diagram illustrating a device 400 for model inference according to an embodiment. For example, the device 400 may be a mobile phone, a computer, a digital broadcasting terminal, a messaging device, a game console, a tablet device, a medical equipment, a fitness equipment, a personal digital assistant, etc.

As illustrated in FIG. 28, the device 400 may include one or more components: a processing component 402, a memory 404, a power supply component 406, a multimedia component 408, an audio component 410, an input/output (I/O) interface 412, a sensor component 414, and a communication component 416.

The processing component 402 generally controls the whole operation of the device 400, such as operations related to display, phone call, data communication, camera operation and recording operation. The processing component 402 may include one or more processors 420 to perform instructions, to complete all or part of steps of the above method. In addition, the processing component 402 may include one or more modules for the convenience of interaction between the processing component 402 and other components. For example, the processing component 402 may include a multimedia module for the convenience of interaction between the multimedia component 408 and the processing component 402.

The memory 404 is configured to store all types of data to support the operation of the device 400. Examples of the data include the instructions of any applications or methods operated on the device 400, contact data, phone book data, messages, pictures, videos, etc. The memory 404 may be implemented by any type of volatile or non-volatile storage devices or their combination, such as a static random access memory (SRAM), an electrically erasable programmable read-only memory (EEPROM), an erasable programmable read-only (EPROM), a programmable read-only memory (PROM), a read-only memory (ROM), a magnetic memory, a flash memory, a magnetic disk or an optical disk.

The power supply component 406 may provide power supply for all components of the device 400. The power supply component 406 may include a power supply management system, one or more power supplies, and other units related to generating, managing and distributing power for the device 400.

The multimedia component 408 includes an output interface screen provided between the device 400 and the user. In some embodiments, the screen may include a liquid crystal display (LCD) and a touch panel (TP). When the screen includes a touch panel, the screen may be implemented as a touch screen to receive input signals from the user. The touch panel includes one or more touch sensors to sense touch, slide and gestures on the touch panel. The touch sensor may not only sense the boundary of touch or slide action, but also detect the duration and pressure related to the touch or slide operation. In some embodiments, the multimedia component 408 includes a front camera and/or a rear camera. When the device 400 is in an operation mode, such as a shooting mode or a video mode, the front camera or the rear camera may receive external multimedia data. Each front camera and rear camera may be a fixed optical lens system or an optical lens system with a focal length and an optical zoom capacity.

The audio component 410 is configured as an output and/or input signal. For example, the audio component 410 includes a microphone (MIC). When the device 400 is in operation mode, such as call mode, record mode, and speech recognition mode, the microphone is configured to receive the external audio signals. The audio signals received may be further stored in the memory 404 or sent via the communication component 416. In some embodiments, the audio component 410 further includes a speaker configured to output an audio signal.

The I/O interface 412 provides an interface for the processing component 402 and the peripheral interface module, and the peripheral interface module may be a keyboard, a click wheel, a button, etc. The buttons may include but not limited to a home button, a volume button, a start button and a lock button.

The sensor component 414 includes one or more sensors, configured to provide various aspects of status assessment for the device 400. For example, the sensor component 414 may detect the on/off state of the device 400 and relative positioning of the component. For example, the component is a display and a keypad of the device 400. The sensor component 414 may further detect the location change of the device 400 or one component of the device 400, the presence or absence of contact between the user and the device 400, the orientation or acceleration/deceleration of the device 400, and the temperature change of the device 400. The sensor component 414 may include a proximity sensor, which is configured to detect the existence of the objects nearby without any physical contact. The sensor component 414 may further include a light sensor such as a CMOS or CCD image sensor, which is configured to use in imaging applications. In some embodiments, the sensor component 414 may further include an acceleration transducer, a gyroscope sensor, a magnetic sensor, a pressure sensor or a temperature sensor.

The communication component 416 is configured for the convenience of wire or wireless communication between the device 400 and other devices. The device 400 may access wireless networks based on communication standard, such as WiFi, 2G or 3G, or their combination. In an embodiment, the communication component 416 receives broadcast signals or broadcast-related information from an external broadcast management system via a broadcast channel. In an embodiment, the communication component 416 further includes a near field communication (NFC) module to facilitate short-range communication. For example, an NFC module may be implemented based on a radio frequency identification (RFID) technology, an infrared data association (IRDA) technology, an ultra-wideband (UWB) technology, bluetooth (BT) technology and other technologies.

In an embodiment, the device 400 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an embodiment, a non-transitory computer readable storage medium is further provided which includes instructions, such as the memory 404 including instructions. The instructions may be executed by the processor 420 of the device 400 to complete the above methods. For example, the non-transitory computer-readable storage medium may be a ROM, a random access memory (RAM), a CD-ROM, a magnetic tape, a floppy disk, an optical data storage device, etc.

Figure 29:
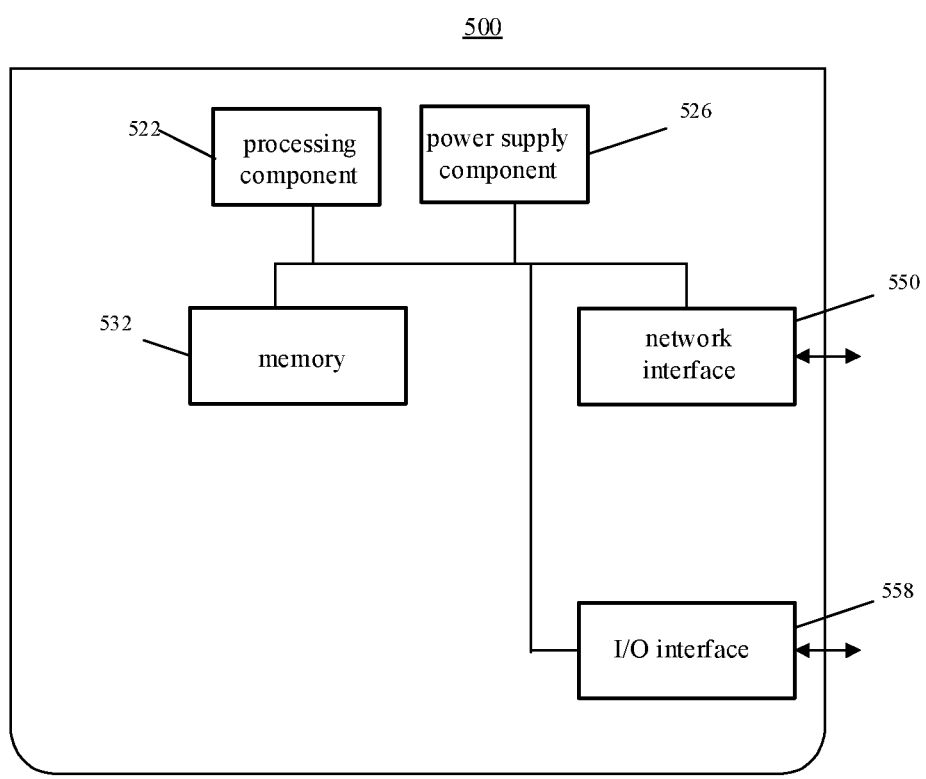
FIG. 29 is a block diagram illustrating another device for model inference according to an embodiment.

FIG. 29 is a block diagram illustrating a device 500 for model inference according to an embodiment. For example, the device 500 may be provided as a server. Referring to FIG. 29, the device 500 includes a processing component 522, which further includes one or more processors, and memory resources represented by a memory 532, which are configured to store instructions executable by the processing component 522, and for example, an application. The application stored in the memory 532 may include one or more modules each of which corresponds to a set of instructions. In addition, the processing component 522 is configured to execute instructions, to perform the above method.

The device 500 may further include one power supply component 526 configured to execute power management of the device 500, and one wired or wireless network interface 550 configured to connect the device 500 to a network, and one input/output (I/O) interface 558. The device 500 may operate an operating system stored in the memory 532, for example, Windows Server™, Mac OS X™, Unix™, Linux™, FreeBSD™.

It may be further understood that, "a plurality of" in the present disclosure means two or above, which is similar to other quantifiers. "and/or", describes the relationship of the association objects, indicating that there may exist three relationships, for example, A and/or B, may represent: any of existing A only, existing both A and B, or existing B only. The character "/" generally means the contextual object is a kind of "or" relationship. The singular forms "a", "the" and "said are also intended to include plural forms, unless the context clearly indicates otherwise.

It should be further understood that, although the terms "first", "second", "third", etc. may be configured to describe various information, such information shall not be limited to these terms. These terms are only used to distinguish the same type of information, rather than indicate a particular order or importance degree. In fact, "first", "second" and other similar descriptions may be used interchangeably. For example, subject to the scope of this present disclosure, first information may also be referred to as second information, and similarly, and second information may also be referred to as first information.

It may be further understood that, even though operations are described in the drawings in a particular order, it should not be understood as requiring that such operations be performed in the particular order shown or in sequential order, or that all illustrated operations be performed to obtain desirable results. In certain circumstances, multitasking and parallel processing may be advantageous.

After considering the specification and practicing the disclosure here, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

What is claimed is:

1. A method for model inference, applicable for an operation administration and maintenance (OAM) entity, comprising:
    determining a first model corresponding to model subscription request information in response to receiving the model subscription request information sent by a control radio access network (RAN) device; and
    obtaining a first number of model segmentation blocks by segmenting the first model, and distributing the first number of model segmentation blocks to a first number of control RAN devices.

2. The method according to claim 1, wherein each of the first number of model segmentation blocks correspondingly has allocation information;
    wherein the allocation information comprises an inference sequence of the first number of model segmentation blocks and a control RAN device corresponding to each of the first number of model segmentation blocks.

3. The method according to claim 1, wherein the first number of control RAN devices comprises a first control RAN device, and the first control RAN device is a control RAN device accessed by a terminal;
    wherein distributing the first number of model segmentation blocks to the first number of control RAN devices comprises:
    determining a plurality of auxiliary control RAN devices from control RAN devices adjacent to the first control RAN device;
    determining a second number of control RAN devices from the plurality of auxiliary control RAN devices based on a computing power occupation state and a load of each of the plurality of auxiliary control RAN devices; wherein the second number of control RAN devices are control RAN devices within the first number of control RAN devices except for the first control RAN device; and
    sending a first model segmentation block to the first control RAN device and distributing a remaining number of model segmentation blocks to the second number of control RAN devices, based on the inference sequence of the first number of model segmentation blocks.

4. The method according to claim 3, further comprising:
    receiving model performance update data sent by the first control RAN device; and
    updating the first model based on the model performance update data, determining an updated model parameter of the first model, and sending the updated model parameter of the first model to the first control RAN device.

5. The method according to claim 3, further comprising:
    updating a distributed RAN device accessed by the terminal in response to receiving a first model analysis subscription update request; wherein the first model analysis subscription update request indicates the terminal to make a switch on the distributed RAN device without making a switch on the control RAN device; or
    updating a distributed RAN device accessed by the terminal and re-segmenting the first model, in response to receiving a second model analysis subscription update request; wherein the second model analysis subscription update request indicates the terminal to make a switch on both the distributed RAN device and the control RAN device.

6. A device for model inference, comprising:
    a processor; and
    a memory for storing instructions executable by the processor;
    wherein the processor is configured to perform the method for model inference of claim 1.

7. A method for model inference, applicable for a control radio access network (RAN) device, comprising:
    in response to receiving a model analysis subscription request sent by a distributed RAN device, obtaining model subscription request information by processing the model analysis subscription request, and sending the model subscription request information to an operation administration and maintenance (OAM) entity; and
    receiving model segmentation blocks sent by the OAM entity; wherein the model segmentation blocks are model segmentation blocks determined by segmenting a first model, and the first model is determined by the OAM entity based on the model subscription request information.

8. The method according to claim 7, further comprising:
    after sending the model subscription information to the OAM entity, sending a model inference data request to the distributed RAN device, wherein the model inference data request is configured to acquire model inference data; and
    obtaining inference intermediate information of the model segmentation blocks by inferring the model segmentation blocks based on the model inference data.

9. The method according to claim 8, wherein the model segmentation blocks correspondingly have allocation information; and the allocation information comprises an inference sequence of a first number of model segmentation blocks and a control RAN device corresponding to each of the first number of model segmentation blocks; and
    the method further comprises:
    in response to the control RAN device being not a last control RAN device, sending the inference intermediate information to a next control RAN device based on the inference sequence; and
    in response to the control RAN device being the last control RAN device, determining a first inference result corresponding to the first model after the model inference is completed, and sending the first inference result to a first control RAN device, wherein the first control RAN device is a control RAN device accessed by a terminal.

10. The method according to claim 9, further comprising:
receiving the first inference result in response to the control RAN device being the first control RAN device; and
sending the first inference result to a first distributed RAN device, wherein the first distributed RAN device is a distributed RAN device accessed by the terminal.

11. The method according to claim 10, wherein after sending the first inference result to the first distributed RAN device, the method further comprises:
receiving performance data sent by the first distributed RAN device, wherein the performance data is real performance data after the terminal adjusts an execution strategy based on the first model; and
obtaining model performance update data by processing the performance data, and sending the model performance update data to the OAM entity.

12. The method according to claim 7, wherein sending the model subscription request information to the OAM entity comprises:
sending the model subscription request information to the OAM entity in response to the control RAN device being a first control RAN device;
wherein the first control RAN device is a control RAN device corresponding to a first distributed RAN device accessed by a terminal.

13. The method according to claim 12, further comprising:
in response to the control RAN device being the first control RAN device, determining a second distributed RAN device that resends the model analysis subscription request if the model analysis subscription request is received again, wherein the second distributed RAN device is a distributed RAN device re-accessed after the terminal makes a switch on the distributed RAN device; and
sending a first inference result to the second distributed RAN device, and sending a model subscription update request to the OAM entity.

14. The method according to claim 13, further comprising:
in response to the control RAN device being a second control RAN device, if the model analysis subscription request is received again, determining the second distributed RAN device that resends the model analysis subscription request and a second control RAN device that receives the model analysis subscription request again, wherein the second control RAN device is a control RAN device corresponding to the second distributed RAN device, and the second distributed RAN device is a distributed RAN device re-accessed after the terminal makes a switch on the distributed RAN device; and
sending the first inference result to the second control RAN device, and sending the model subscription update request to the OAM entity.

15. A device for model inference, comprising:
a processor; and
a memory for storing instructions executable by the processor;
wherein the processor is configured to perform the method for model inference of claim 7.

16. A method for model inference, applicable for a distributed radio access network (RAN) device, comprising:
sending a model analysis subscription request to a control RAN device in response to receiving the model analysis subscription request sent by a terminal;
wherein the model analysis subscription request is configured to acquire a first model from an operation administration and maintenance (OAM) entity; and the first model comprises a first number of model segmentation blocks.

17. The method according to claim 16, further comprising:
receiving a model inference data request sent by the control RAN device, wherein the model inference data request is configured to acquire model inference data; and
acquiring the model inference data from the terminal, and sending the model inference data to the control RAN device.

18. The method according to claim 16, further comprising:
receiving a first inference result sent by a first control RAN device, in response to the distributed RAN device being a first distributed RAN device; and
sending the first inference result to the terminal.

19. The method according to claim 18, wherein after sending the first inference result to the terminal, the method further comprises:
receiving performance data sent by the terminal in response to the distributed RAN device being the first distributed RAN device; wherein the performance data is real performance data after the terminal adjusts an execution strategy based on the first model; and
sending the performance data to the first control RAN device.

20. The method according to claim 16, further comprising:
in response to the distributed RAN device being a second distributed RAN device, if the model analysis subscription request resent by the terminal is received, determining to send the model analysis subscription request to a control RAN device corresponding to the second distributed RAN device;
wherein the second distributed RAN device is a distributed RAN device re-accessed after the terminal makes a switch on the distributed RAN device.

* * * * *